(12) United States Patent
You et al.

(10) Patent No.: US 10,455,565 B2
(45) Date of Patent: Oct. 22, 2019

(54) METHOD AND MTC DEVICE FOR RECEIVING DOWNLINK CONTROL CHANNEL

(71) Applicant: LG ELECTRONICS INC., Seoul (KR)

(72) Inventors: Hyangsun You, Seoul (KR); Yunjung Yi, Seoul (KR); Kijun Kim, Seoul (KR); Suckchel Yang, Seoul (KR); Hanbyul Seo, Seoul (KR)

(73) Assignee: LG ELECTRONICS INC., Seoul (KR)

(*) Notice: Subject to any disclaimer, the term of this patent is extended or adjusted under 35 U.S.C. 154(b) by 0 days.

(21) Appl. No.: 15/509,162

(22) PCT Filed: Sep. 24, 2015

(86) PCT No.: PCT/KR2015/010079
§ 371 (c)(1),
(2) Date: Mar. 6, 2017

(87) PCT Pub. No.: WO2016/048055
PCT Pub. Date: Mar. 31, 2016

(65) Prior Publication Data
US 2017/0273059 A1 Sep. 21, 2017

Related U.S. Application Data

(60) Provisional application No. 62/054,404, filed on Sep. 24, 2014, provisional application No. 62/073,036, (Continued)

(51) Int. Cl.
*H04W 72/04* (2009.01)
*H04L 25/03* (2006.01)
(Continued)

(52) U.S. Cl.
CPC ......... *H04W 72/042* (2013.01); *H04L 5/0053* (2013.01); *H04L 5/0094* (2013.01);
(Continued)

(58) Field of Classification Search
CPC ........... H04W 72/042; H04W 72/1205; H04W 84/042; H04W 4/70; H04W 4/005;
(Continued)

(56) References Cited

U.S. PATENT DOCUMENTS

2011/0222629 A1 9/2011 Lindh et al.
2013/0064216 A1* 3/2013 Gao ..................... H04W 72/04
370/330
(Continued)

FOREIGN PATENT DOCUMENTS

JP 2013183299 9/2013
WO 2012064076 5/2012
(Continued)

OTHER PUBLICATIONS

PCT International Application No. PCT/KR2015/010079, International Search Report dated Jan. 6, 2016, 2 pages.
(Continued)

*Primary Examiner* — Jung Liu
(74) *Attorney, Agent, or Firm* — Envision USA INC.

(57) ABSTRACT

Provided is a method for receiving a downlink control channel in a machine type communication (MTC) device configured to operate only in a part of a band among system bands of a cell. A method for receiving a downlink control channel can comprise the steps of: determining a precoding matrix index (PMI) applied to a downlink control channel receivable only in a part of a band; receiving from a cell the downlink control channel in the part of the band in a data
(Continued)

area of a subframe; and decoding the downlink control channel, which has been received from the cell, on the basis of the determined PMI.

4 Claims, 28 Drawing Sheets

Related U.S. Application Data filed on Oct. 31, 2014, provisional application No. 62/090,888, filed on Dec. 12, 2014, provisional application No. 62/096,546, filed on Dec. 24, 2014, provisional application No. 62/108,546, filed on Jan. 28, 2015, provisional application No. 62/135,678, filed on Mar. 19, 2015.

(51) Int. Cl.
*H04W 72/12* (2009.01)
*H04L 5/00* (2006.01)
*H04W 4/70* (2018.01)
*H04W 84/04* (2009.01)

(52) U.S. Cl.
CPC .......... *H04L 25/03* (2013.01); *H04W 72/1205* (2013.01); *H04L 5/0023* (2013.01); *H04W 4/70* (2018.02); *H04W 84/042* (2013.01)

(58) Field of Classification Search
CPC .... H04W 72/04; H04L 5/0023; H04L 5/0035; H04L 5/0055; H04L 5/0057; H04L 12/2869; H04L 12/5695; H04L 47/00; H04L 47/70; H04L 47/78; H04L 47/821; H04L 47/827
See application file for complete search history.

(56) References Cited

U.S. PATENT DOCUMENTS

| | | | |
|---|---|---|---|
| 2013/0083753 A1* | 4/2013 | Lee | H04W 74/0833 |
| | | | 370/329 |
| 2013/0094457 A1 | 4/2013 | Seo et al. | |
| 2013/0176952 A1* | 7/2013 | Shin | H04L 5/001 |
| | | | 370/329 |
| 2013/0250874 A1* | 9/2013 | Luo | H04W 72/04 |
| | | | 370/329 |
| 2014/0056244 A1 | 2/2014 | Frenne et al. | |
| 2014/0269594 A1 | 9/2014 | Jang et al. | |
| 2015/0201402 A1* | 7/2015 | Morioka | H04W 72/0453 |
| | | | 370/329 |

FOREIGN PATENT DOCUMENTS

| | | |
|---|---|---|
| WO | 2013168562 | 11/2013 |
| WO | 2014055878 | 4/2014 |
| WO | 2014069946 | 5/2014 |

OTHER PUBLICATIONS

European Patent Office Application Serial No. 15844009.9, Search Report dated May 18, 2018, 9 pages.
Japan Patent Office Application No. 2017-516342, Office Action dated Mar. 20, 2018, 2 pages.
Intel, "Coverage enhancement of DL/UL control channels for low cost MTC", 3GPP TSG RAN WG1 Meeting #75, R1-135105, Nov. 2013, 10 pages.
Communication pursuant to Article 94(3) EPC dated Jun. 13, 2019 in EP Patent Application No. 15 844 009.9.
Huawei et al., "Discussion on ePDCCH common search space", 3GPP DRAFT; R1-120997, Mar. 20, 2012, XP050599308.
NTT DOCOMO, "Design of EPDCCH Search Space for law cost MTC", 3GPP DRAFT; R1-144147, Oct. 5, 2014, XP050875430.

* cited by examiner

METHOD AND MTC DEVICE FOR RECEIVING DOWNLINK CONTROL CHANNEL

CROSS-REFERENCE TO RELATED APPLICATIONS

This application is the National Stage filing under 35 U.S.C. 371 of International Application No. PCT/KR2015/010079, filed on Sep. 24, 2015, which claims the benefit of U.S. Provisional Applications No. 62/054,404, filed on Sep. 24, 2014, 62/073,036, filed on Oct. 31, 2014, 62/090,888, filed on Dec. 12, 2014, 62/096,546, filed on Dec. 24, 2014, 62/108,546, filed on Jan. 28, 2015 and 62/135,678, filed on Mar. 19, 2015, the contents of which are all hereby incorporated by reference herein in their entirety.

BACKGROUND OF THE INVENTION

Field of the Invention

The present invention relates to mobile communication.

Related Art

3GPP (3rd Generation Partnership Project) LTE (Long Term Evolution) that is an advancement of UMTS (Universal Mobile Telecommunication System) is being introduced with 3GPP release 8. In 3GPP LTE, OFDMA (orthogonal frequency division multiple access) is used for downlink, and SC-FDMA (single carrier-frequency division multiple access) is used for uplink. The 3GPP LTE adopts MIMO (multiple input multiple output) having maximum four antennas. Recently, a discussion of 3GPP LTE-A (LTE-Advanced) which is the evolution of the 3GPP LTE is in progress.

As set forth in 3GPP TS 36.211 V10.4.0, the physical channels in 3GPP LTE may be classified into data channels such as PDSCH (physical downlink shared channel) and PUSCH (physical uplink shared channel) and control channels such as PDCCH (physical downlink control channel), PCFICH (physical control format indicator channel), PHICH (physical hybrid-ARQ indicator channel) and PUCCH (physical uplink control channel).

Meanwhile, in recent years, communication, i.e., machine type communication (MTC), occurring between devices or between a device and a server without a human interaction, i.e., a human intervention, is actively under research. The MTC refers to the concept of communication based on a legacy wireless communication network used by a machine device instead of a user equipment (UE) used by a user.

Since the MTC has a feature different from that of a normal UE, a service optimized to the MTC may differ from a service optimized to human-to-human communication. In comparison with a current mobile network communication service, the MTC can be characterized as a different market scenario, data communication, less costs and efforts, a potentially great number of MTC apparatuses, wide service areas, low traffic for each MTC apparatus, etc.

In order to reduce cost of an MTC device, the MTC device may use only a reduced band, regardless of a system bandwidth of a cell.

Here, however, a problem arises in that a legacy downlink control channel cannot be operated in the reduced band.

SUMMARY OF THE INVENTION

Accordingly, the disclosure of the specification has been made in an effort to solve the problem.

In order to achieve the above object, the present disclosure newly proposes a downlink control channel transmittable in a band in which an MTC device operates.

In detail, in order to achieve the above object, an embodiment of the present disclosure provides a method for receiving a downlink control channel in a machine type communication (MTC) device configured to operate only in a partial band of a system band of a cell. The method for receiving a downlink control channel may include: determining a precoding matrix index (PMI) applied to a downlink control channel receivable only in the partial band; receiving the downlink control channel in the partial band in a data region of a subframe from the cell; and decoding the downlink control channel, which has been received from the cell, on the basis of the determined PMI.

The partial band may correspond to six physical resource blocks (PRBs) of the system band.

The method may further include: receiving information regarding the PMI in the case of localized transmission in which the downlink control channel is mapped only to partial PRBs, wherein the determination of the PMI may be performed on the basis of the received information regarding the PMI.

In the case of distributed transmission in which the downlink control channel is mapped to multiple PRBs, the PMI may be determined on the basis of any one of an index of the partial band, an index of the PRB, an index of a transmission antenna port transmitting the downlink control channel, and an index of the subframe.

In the determining of the PMI, a pattern of the PMI regarding the downlink control channel may be determined.

The method may further include: receiving information regarding the PMI determined by the cell on the basis of any one of an index of the partial band, an index of the PRB, an index of a transmission antenna port transmitting the downlink control channel, and an index of the subframe in the case of distributed transmission in which the downlink control channel is mapped to multiple PRBs.

In order to achieve the above object, an embodiment of the present disclosure provides a machine type communication (MTC) device configured to operate only in a partial band of a system band of a cell. The MTC device may include: a processor determining a precoding matrix index (PMI) applied to a downlink control channel receivable only in the partial band; and a reception unit receiving the downlink control channel in the partial band in a data region of a subframe from the cell, wherein the processor decodes the downlink control channel, which has been received from the cell, on the basis of the determined PMI.

According to the embodiment of the present disclosure, the aforementioned problem of the related art is solved.

DESCRIPTION OF EXEMPLARY EMBODIMENTS

Figure 1:
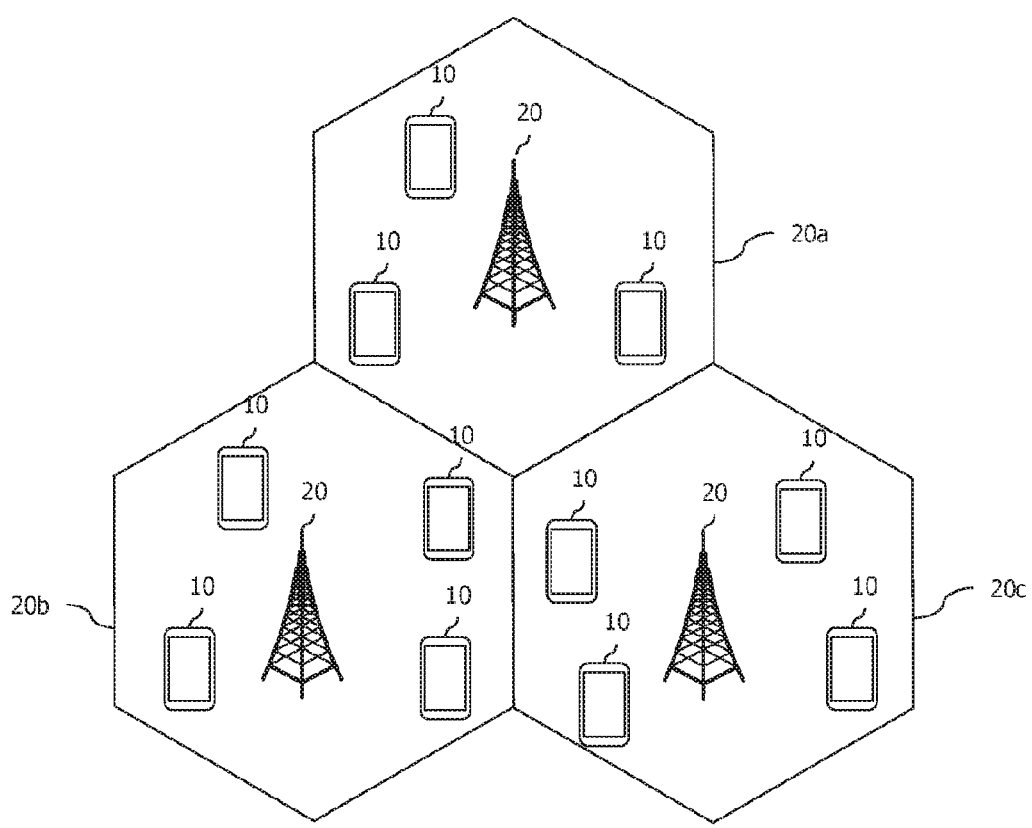
FIG. 1 illustrates a wireless communication system.

Hereinafter, based on 3rd Generation Partnership Project (3GPP) long term evolution (LTE) or 3GPP LTE-advanced (LTE-A), the present invention will be applied. This is just an example, and the present invention may be applied to various wireless communication systems. Hereinafter, LTE includes LTE and/or LTE-A.

The technical terms used herein are used to merely describe specific embodiments and should not be construed as limiting the present invention. Further, the technical terms used herein should be, unless defined otherwise, interpreted as having meanings generally understood by those skilled in the art but not too broadly or too narrowly. Further, the technical terms used herein, which are determined not to exactly represent the spirit of the invention, should be replaced by or understood by such technical terms as being able to be exactly understood by those skilled in the art. Further, the general terms used herein should be interpreted in the context as defined in the dictionary, but not in an excessively narrowed manner.

The expression of the singular number in the specification includes the meaning of the plural number unless the meaning of the singular number is definitely different from that of the plural number in the context. In the following description, the term 'include' or 'have' may represent the existence of a feature, a number, a step, an operation, a component, a part or the combination thereof described in the specification, and may not exclude the existence or addition of another feature, another number, another step, another operation, another component, another part or the combination thereof.

The terms 'first' and 'second' are used for the purpose of explanation about various components, and the components are not limited to the terms 'first' and 'second'. The terms 'first' and 'second' are only used to distinguish one component from another component. For example, a first component may be named as a second component without deviating from the scope of the present invention.

It will be understood that when an element or layer is referred to as being "connected to" or "coupled to" another element or layer, it can be directly connected or coupled to the other element or layer or intervening elements or layers may be present. In contrast, when an element is referred to as being "directly connected to" or "directly coupled to" another element or layer, there are no intervening elements or layers present.

Hereinafter, embodiments of the present invention will be described in greater detail with reference to the accompanying drawings. In describing the present invention, for ease of understanding, the same reference numerals are used to denote the same components throughout the drawings, and repetitive description on the same components will be omitted. Detailed description on well-known arts which are determined to make the gist of the invention unclear will be omitted. The accompanying drawings are provided to merely make the spirit of the invention readily understood, but not should be intended to be limiting of the invention. It should be understood that the spirit of the invention may be expanded to its modifications, replacements or equivalents in addition to what is shown in the drawings.

As used herein, 'base station' generally refers to a fixed station that communicates with a wireless device and may be denoted by other terms such as eNB (evolved-NodeB), BTS (base transceiver system), or access point.

As used herein, user equipment (UE) may be stationary or mobile, and may be denoted by other terms such as device, wireless device, terminal, MS (mobile station), UT (user terminal), SS (subscriber station), MT (mobile terminal) and etc.

FIG. 1 illustrates a wireless communication system.

As seen with reference to FIG. 1, the wireless communication system includes at least one base station (BS) 20. Each base station 20 provides a communication service to specific geographical areas (generally, referred to as cells) 20a, 20b, and 20c. The cell can be further divided into a plurality of areas (sectors).

The UE generally belongs to one cell and the cell to which the terminal belong is referred to as a serving cell. A base station that provides the communication service to the serving cell is referred to as a serving BS. Since the wireless communication system is a cellular system, another cell that neighbors to the serving cell is present. Another cell which neighbors to the serving cell is referred to a neighbor cell. A base station that provides the communication service to the neighbor cell is referred to as a neighbor BS. The serving cell and the neighbor cell are relatively decided based on the UE.

Hereinafter, a downlink means communication from the base station 20 to the UE1 10 and an uplink means communication from the UE 10 to the base station 20. In the downlink, a transmitter may be a part of the base station 20 and a receiver may be a part of the UE 10. In the uplink, the transmitter may be a part of the UE 10 and the receiver may be a part of the base station 20.

Meanwhile, the wireless communication system may be generally divided into a frequency division duplex (FDD) type and a time division duplex (TDD) type. According to the FDD type, uplink transmission and downlink transmission are achieved while occupying different frequency bands. According to the TDD type, the uplink transmission and the downlink transmission are achieved at different time while occupying the same frequency band. A channel response of the TDD type is substantially reciprocal. This means that a downlink channel response and an uplink channel response are approximately the same as each other in a given frequency area. Accordingly, in the TDD based wireless communication system, the downlink channel response may be acquired from the uplink channel response. In the TDD type, since an entire frequency band is time-divided in the uplink transmission and the downlink transmission, the downlink transmission by the base station and the uplink transmission by the terminal may not be performed simultaneously. In the TDD system in which the uplink transmission and the downlink transmission are divided by the unit of a sub-frame, the uplink transmission and the downlink transmission are performed in different sub-frames.

Hereinafter, the LTE system will be described in detail.

Figure 2:
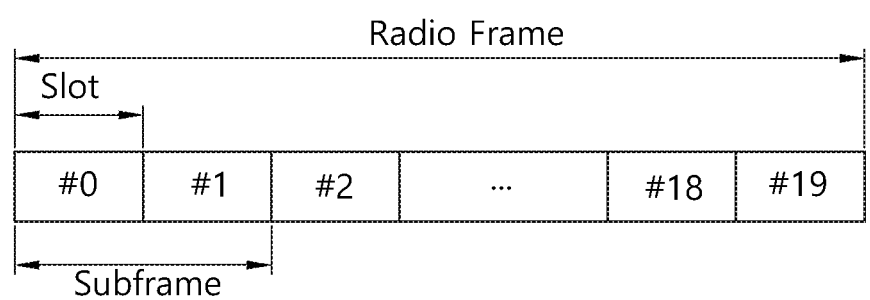
FIG. 2 illustrates the architecture of a radio frame according to frequency division duplex (FDD) of 3rd generation partnership project (3GPP) long term evolution (LTE).

FIG. 2 Shows a Downlink Radio Frame Structure According to FDD of 3rd Generation Partnership Project (3GPP) Long Term Evolution (LTE).

The radio frame of FIG. 2 may be found in the section 5 of 3GPP TS 36.211 V10.4.0 (2011-12) "Evolved Universal Terrestrial Radio Access (E-UTRA); Physical Channels and Modulation (Release 10)".

Referring to FIG. 2, the radio frame consists of 10 subframes. One subframe consists of two slots. Slots included in the radio frame are numbered with slot numbers 0 to 19. A time required to transmit one subframe is defined as a transmission time interval (TTI). The TTI may be a scheduling unit for data transmission. For example, one radio frame may have a length of 10 milliseconds (ms), one subframe may have a length of 1 ms, and one slot may have a length of 0.5 ms.

The structure of the radio frame is for exemplary purposes only, and thus the number of subframes included in the radio frame or the number of slots included in the subframe may change variously.

Meanwhile, one slot may include a plurality of orthogonal frequency division multiplexing (OFDM) symbols. The number of OFDM symbols included in one slot may vary depending on a cyclic prefix (CP). One slot includes 7 OFDM symbols in case of a normal CP, and one slot includes 6 OFDM symbols in case of an extended CP. Herein, since the 3GPP LTE uses orthogonal frequency division multiple access (OFDMA) in a downlink (DL), the OFDM symbol is only for expressing one symbol period in a time domain, and there is no limitation in a multiple access scheme or terminologies. For example, the OFDM symbol may also be referred to as another terminology such as a single carrier frequency division multiple access (SC-FDMA) symbol, a symbol period, etc.

Figure 3:
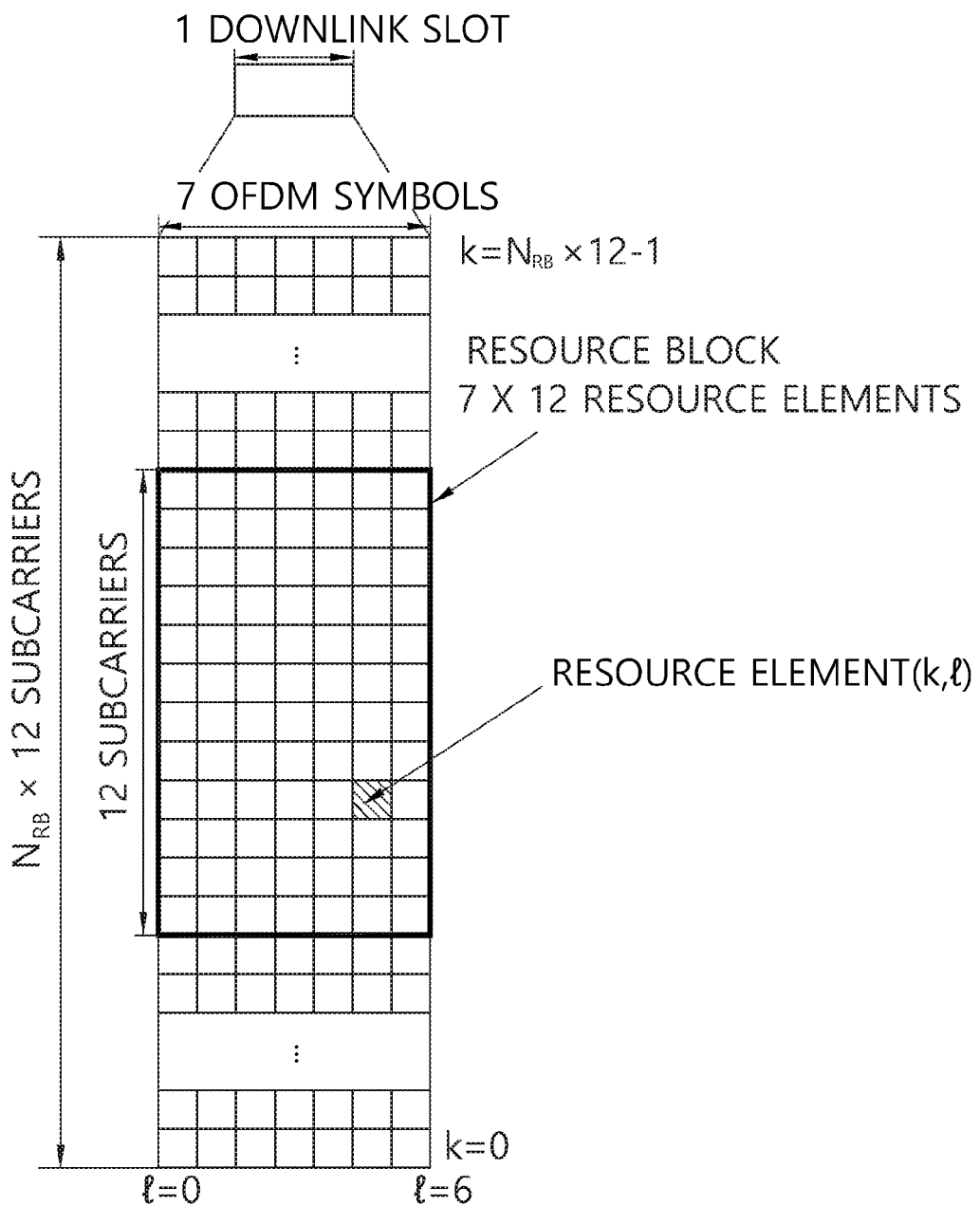
FIG. 3 illustrates an example of a resource grid for one uplink or downlink slot in 3GPP LTE.

FIG. 3 Illustrates an Example Resource Grid for One Uplink or Downlink Slot in 3GPP LTE.

Referring to FIG. 3, the uplink slot includes a plurality of OFDM (orthogonal frequency division multiplexing) symbols in the time domain and NRB resource blocks (RBs) in the frequency domain. For example, in the LTE system, the number of resource blocks (RBs), i.e., $N_{RB}$, may be one from 6 to 110.

Resource block (RB) is a resource allocation unit and includes a plurality of sub-carriers in one slot. For example, if one slot includes seven OFDM symbols in the time domain and the resource block includes 12 sub-carriers in the frequency domain, one resource block may include 7×12 resource elements (REs).

Meanwhile, the number of sub-carriers in one OFDM symbol may be one of 128, 256, 512, 1024, 1536, and 2048.

In 3GPP LTE, the resource grid for one uplink slot shown in FIG. 3 may also apply to the resource grid for the downlink slot.

Figure 4:
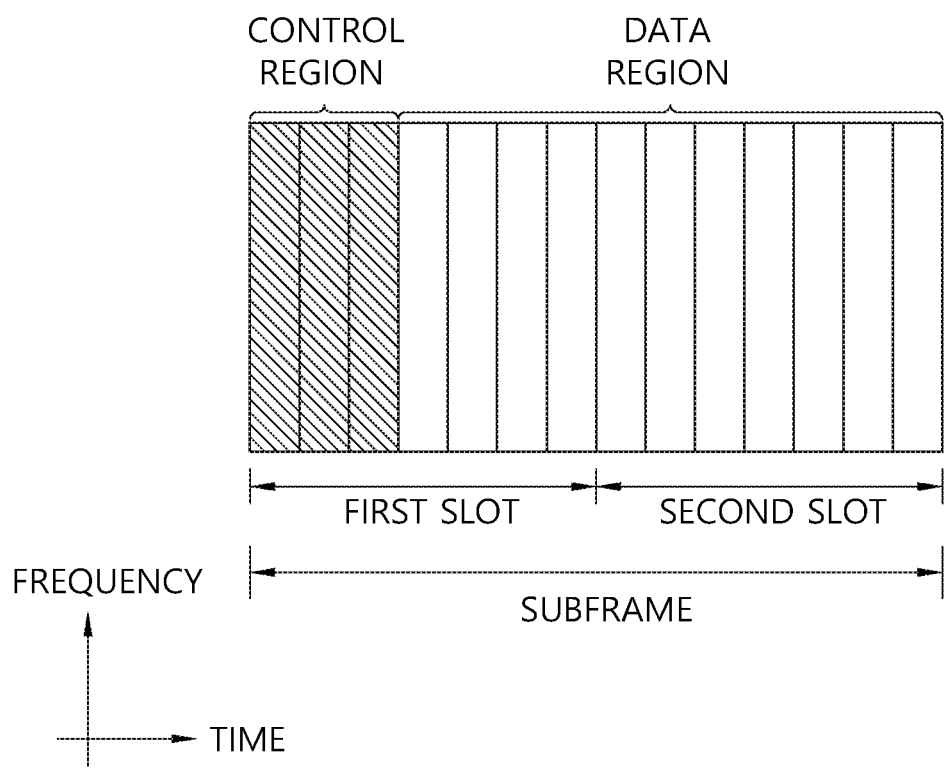
FIG. 4 illustrates the architecture of a downlink subframe.

FIG. 4 Illustrates the Architecture of a Downlink Sub-Frame.

In FIG. 4, assuming the normal CP, one slot includes seven OFDM symbols, by way of example.

The DL (downlink) sub-frame is split into a control region and a data region in the time domain. The control region includes up to first three OFDM symbols in the first slot of the sub-frame. However, the number of OFDM symbols included in the control region may be changed. A PDCCH (physical downlink control channel) and other control channels are allocated to the control region, and a PDSCH is allocated to the data region.

The physical channels in 3GPP LTE may be classified into data channels such as PDSCH (physical downlink shared channel) and PUSCH (physical uplink shared channel) and control channels such as PDCCH (physical downlink control channel), PCFICH (physical control format indicator channel), PHICH (physical hybrid-ARQ indicator channel) and PUCCH (physical uplink control channel).

Figure 5:
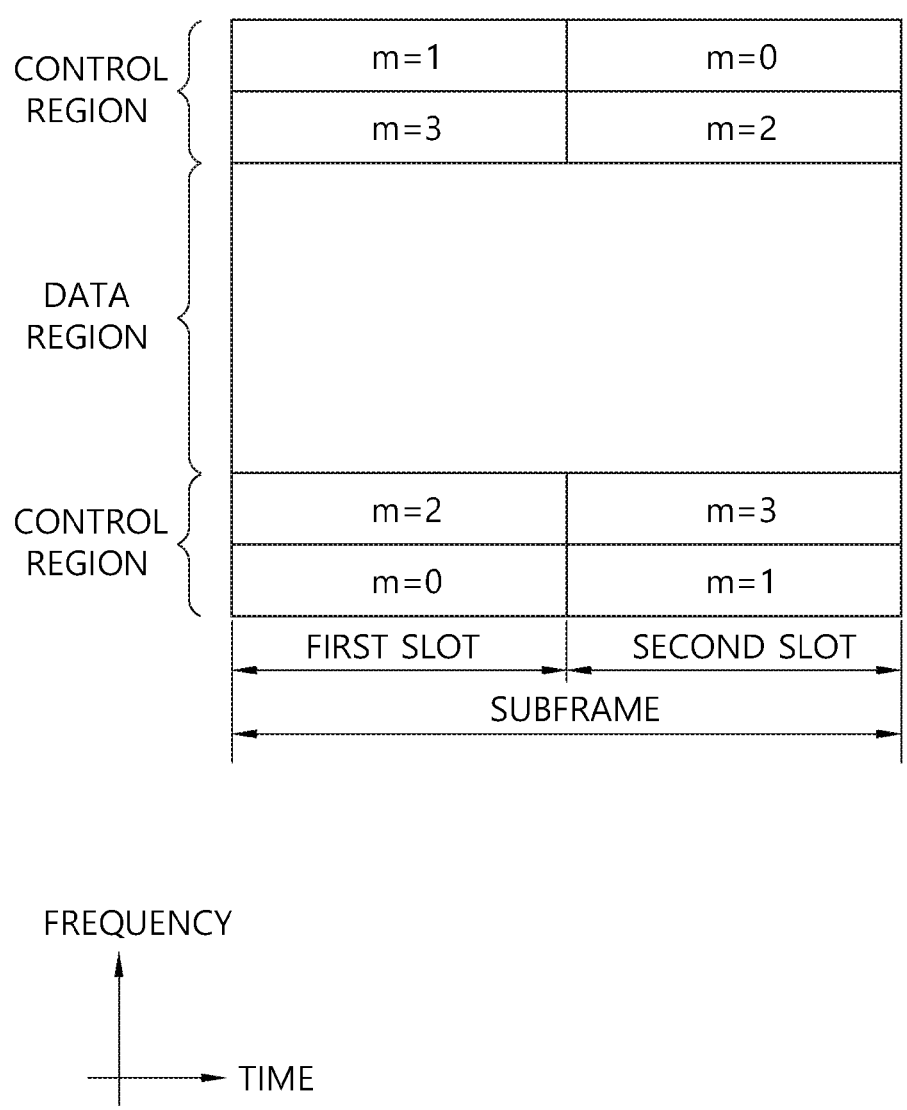
FIG. 5 illustrates the architecture of an uplink subframe in 3GPP LTE.

FIG. 5 Illustrates the Architecture of an Uplink Sub-Frame in 3GPP LTE.

Referring to FIG. 5, the uplink sub-frame may be separated into a control region and a data region in the frequency domain. The control region is assigned a PUCCH (physical uplink control channel) for transmission of uplink control information. The data region is assigned a PUSCH (physical uplink shared channel) for transmission of data (in some cases, control information may also be transmitted).

The PUCCH for one terminal is assigned in resource block (RB) pair in the sub-frame. The resource blocks in the resource block pair take up different sub-carriers in each of the first and second slots. The frequency occupied by the resource blocks in the resource block pair assigned to the PUCCH is varied with respect to a slot boundary. This is referred to as the RB pair assigned to the PUCCH having been frequency-hopped at the slot boundary.

The terminal may obtain a frequency diversity gain by transmitting uplink control information through different sub-carriers over time. m is a location index that indicates a logical frequency domain location of a resource block pair assigned to the PUCCH in the sub-frame.

The uplink control information transmitted on the PUCCH includes an HARQ (hybrid automatic repeat request), an ACK (acknowledgement)/NACK (non-acknowledgement), a CQI (channel quality indicator) indicating a downlink channel state, and an SR (scheduling request) that is an uplink radio resource allocation request.

The PUSCH is mapped with a UL-SCH that is a transport channel. The uplink data transmitted on the PUSCH may be a transport block that is a data block for the UL-SCH transmitted for the TTI. The transport block may be user information. Or, the uplink data may be multiplexed data. The multiplexed data may be data obtained by multiplexing the transport block for the UL-SCH and control information. For example, the control information multiplexed with the data may include a CQI, a PMI (precoding matrix indicator), an HARQ, and an RI (rank indicator). Or, the uplink data may consist only of control information.

<Reference Signal>

Meanwhile, a reference signal (RS) is hereinafter described.

In general, transmission information, i.e., data, is easily distorted or changed when transmitted through a wireless channel Thus, to demodulate the transmission information without an error, a reference signal is needed.

The reference signal is a signal well known between a transmitter and a receiver, and transmitted along with transmission information. Transmission information transmitted by the transmitter goes through various channels corresponding to transmission antennas or layers, and therefore, the reference signal may be allocated to each transmission antenna or layer. A reference signal for each transmission antenna or layer may be distinguishable using a resource such as time, frequency, or code. The reference signal may be used for two purposes: demodulation of transmission information and channel estimation.

A downlink reference signal may be classified as a cell-specific RS (CRS), MBMS over a Single Frequency Network (MBSFN) RS, a UE-specific RS (URS), a positioning RS (PRS), or a CSI-RS. The CRS is an RS transmitted to every UE in a cell, and may be referred to as a common reference signal. The CRS may be used for channel estimation in response to a CQI feedback and channel estimation for a PDSCH. The MBSFN RS may be transmitted to a subframe allocated to transmit a MBSFN. The URS is a reference signal received by a specific UE or a specific UE group in a cell, and may be referred to as a demodulation RS (DM-RS). The DM-RS is primarily used for data demodulation by a specific UE or a specific UE group. The PRS may be used for estimation of a location of an UE. The CSI-RS is used for estimation of a channel for a PDSCH of an LTE-A UE. The CSI-RS is sparsely arranged in frequency domain or time domain, and may be punctured in a data region of a normal subframe or an MBSFN subframe.

Figure 6:
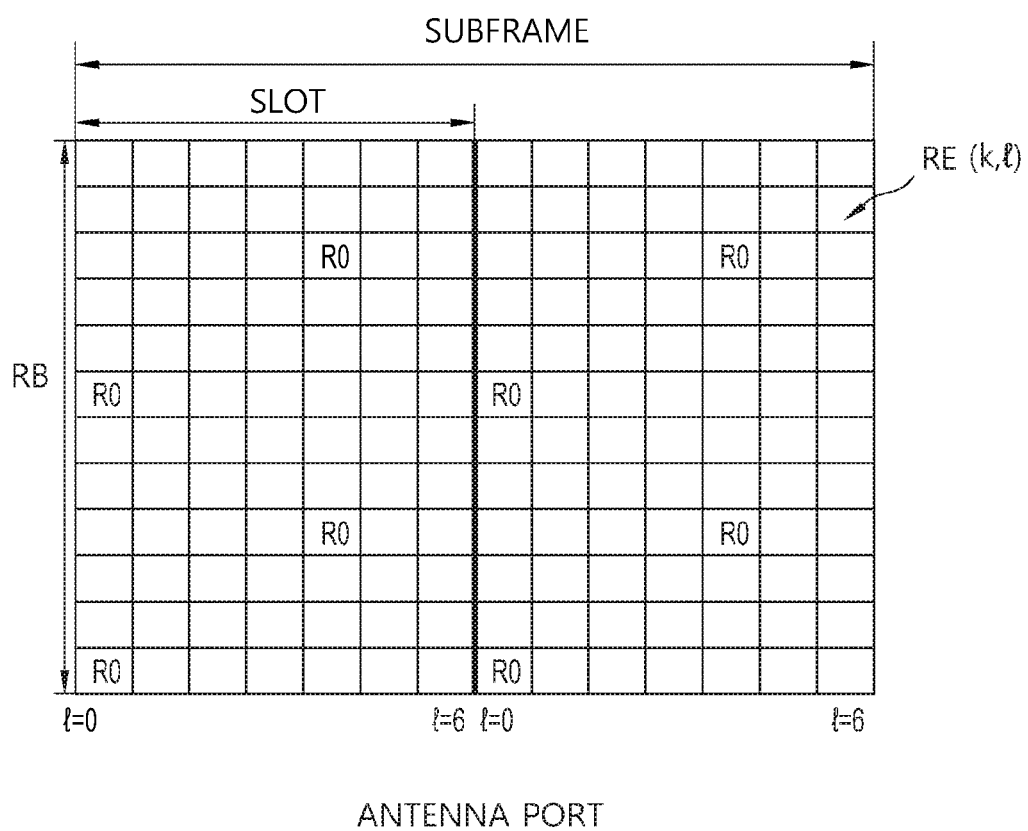
FIG. 6 is a view illustrating an example of a pattern in which CRS is mapped to an RB when a base station (BS) uses a single antenna port.

FIG. 6 Shows an Exemplary Pattern in which a CRS is Mapped to an RB in a Case where a Base Station Uses a Single Antenna Port.

Referring to FIG. 6, R0 indicates an RE onto which a CRS transmitted by antenna port 0 of the base station is mapped.

A CRS is transmitted by every downlink subframe in a cell that supports transmission of a PDSCH. The CRS may be transmitted over antenna port 0 or antenna port 3.

An RE allocated to a CRS of a single antenna port is not able to be used for transmission of a different antenna port, and should be set as zero. In addition, in a MBSFN (multicast-broadcast single frequency network) subframe, a CRS is transmitted in a non MBSFN region.

<Carrier Aggregation>

Hereinafter, a carrier aggregation (CA) system will be described.

The CA system refers to aggregate a plurality of component carriers (CCs). Due to CA, the meaning of a legacy cell has been changed. According to CA, a cell may refer to a combination of a downlink (DL) CC and an uplink (UL) CC or a single DL CC.

Also, in CA, a cell may be classified as a primary cell, a secondary cell, and a serving cell. The primary cell refers to a cell operating in a primary frequency and refers to a cell in which a UE performs an initial connection establishment procedure or a connection re-establishment procedure with a BS (or an eNB) or a cell indicated as a primary cell during a handover procedure. The secondary cell refers to a cell operating in a secondary frequency, which is configured once RRC connection is established and which is used to provide additional wireless resource.

As mentioned above, in the CC system, a plurality of CCs, i.e., a plurality of serving cells, may be supported, unlike a single carrier system.

Such carrier aggregation system may support cross-carrier scheduling. The cross-carrier scheduling is a scheduling scheme that may conduct resource allocation of a PUSCH transmitted through other component carriers than the component carrier basically linked to a specific component carrier and/or resource allocation of a PDSCH transmitted through other component carriers through a PDCCH transmitted through the specific component carrier.

<EPDCCH (Enhanced Physical Downlink Control CHannel>

Meanwhile, a PDCCH is monitored in a limited area called a control area within a subframe, and a CRS transmitted in the entire band is used to demodulate the PDCCH. As types of control information is varied and an amount of control information is increased, flexibility of scheduling is lowered only by the legacy PDCCH. Also, in order to reduce a burden of CRS transmission, an enhanced PDCCH (EPDCCH) has been introduced.

Figure 7:
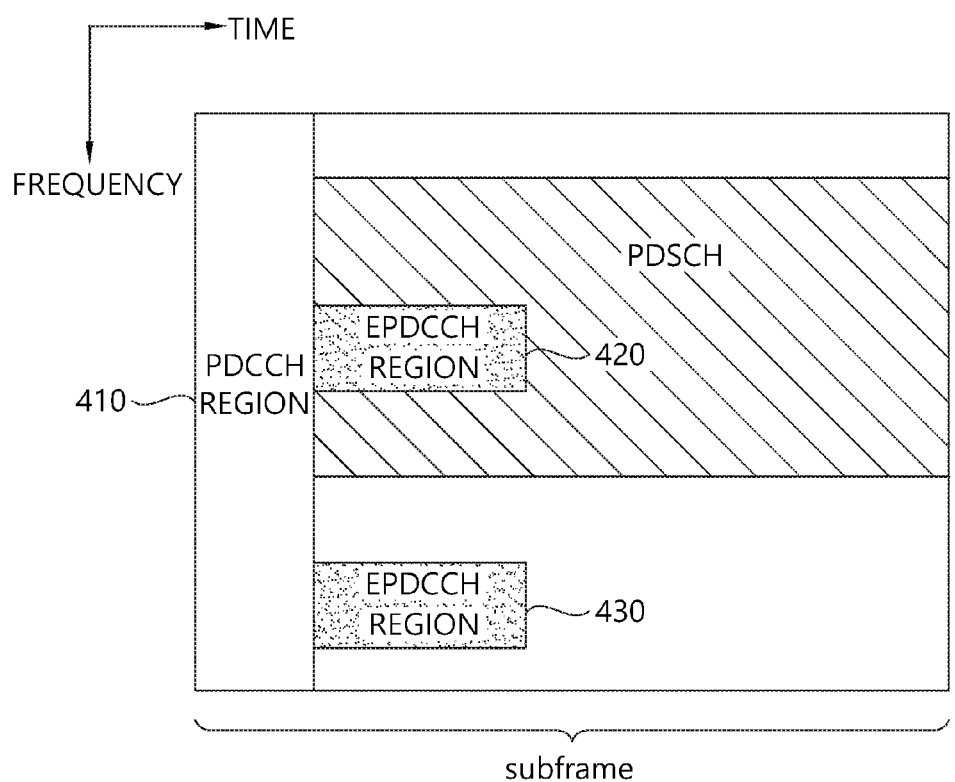
FIG. 7 is a view illustrating an example of a subframe having an EPDCCH.

FIG. 7 illustrates an example of a subframe having an EPDCCH.

A subframe may include zero or one PDCCH region 410 and zero or more EPDCCH regions 420 and 430.

The EPDCCH regions 420 and 430 are regions in which a wireless device monitors an EPDCCH. The PDCCH region 410 is positioned within a maximum of four front OFDM symbols of the subframe, while the EPDCCH regions 420 and 430 may be flexibly scheduled in OFDM symbols after the PDCCH region 410.

One or more EPDCCH regions 420 and 430 are designated in a wireless device, and the wireless device may monitor an EPDCCH in the designated EPDCCH regions 420 and 430.

The number/position/size of the EPDCCH regions 420 and 430 and/or information regarding a subframe for monitoring the EPDCCH may be provided by a BS to the wireless device through an RRC message, or the like.

In the PDCCH region 410, a PDCCH may be demodulated on the basis of a CRS. In the EPDCCH regions 420 and 430, a demodulation (DM) RS, not the CRS, may be defined to demodulate the EPDCCH. An associated DM RS may be transmitted in the corresponding EPDCCH regions 420 and 430.

The EPDCCH regions 420 and 430 may each be used in scheduling for different cells. For example, an EPDCCH within the EPDCCH region 420 may carry scheduling information for a primary cell, and an EPDCCH within the EPDCCH region 430 may carry scheduling information for a secondary cell.

When an EPDCCH is transmitted in the EPDCCH regions 420 and 430 through multiple antennas, the same precoding as that of the EPDCCH may be applied to a DMRS within the EPDCCH regions 420 and 430.

Compared with a PDCCH which uses a CCE as a transmission resource unit, a transmission resource unit for an EPCCH is called an enhanced control channel element (ECCE). An aggregation level may be defined by a resource unit for monitoring an EPDCCH. For example, when 1 ECCE is a minimum resource for an EPDCCH, the aggregation level may be defined as L={1, 2, 4, 8, 16}.

Hereinafter, an EPDCCH search space may correspond to an EPDCCH region. In the EPDCCH search space, one or more EPDCCH candidates may be monitored at every one or more aggregation levels.

Hereinafter, resource allocation for an EPDCCH will be described.

An EPDCCH is transmitted using one or more ECCEs. An ECCE includes a plurality of enhanced resource element groups (EREGs). An ECCE may include 4 EGEGs or 8 EREGs according to a subframe type and a CP according to time division duplex (TDD) DL-UL configuration. For example, in a regular CP, an ECCE may include four EREGs, and in an extended CP, an ECCE may include eight EREGs.

A physical resource block (PRB) pair refers to two PRBs having the same RB number in a subframe. A PRB pair refers to a first PRB of a first slot and a second PRB of a second slot in the same frequency region. In a regular CP, a PRB pair includes 12 subcarriers and 14 OFDM symbols, and thus, it includes 168 resource elements (REs).

An EPDCCH search space may be configured by one or a plurality of PRB pairs. One PRB pair includes 16 EREGs. Thus, when an ECCE includes 4 EREGs, the PRB pair includes 4 ECCEs, and when an ECCE includes 8 EREGs, the PRB pair includes two ECCEs.

Figure 8:
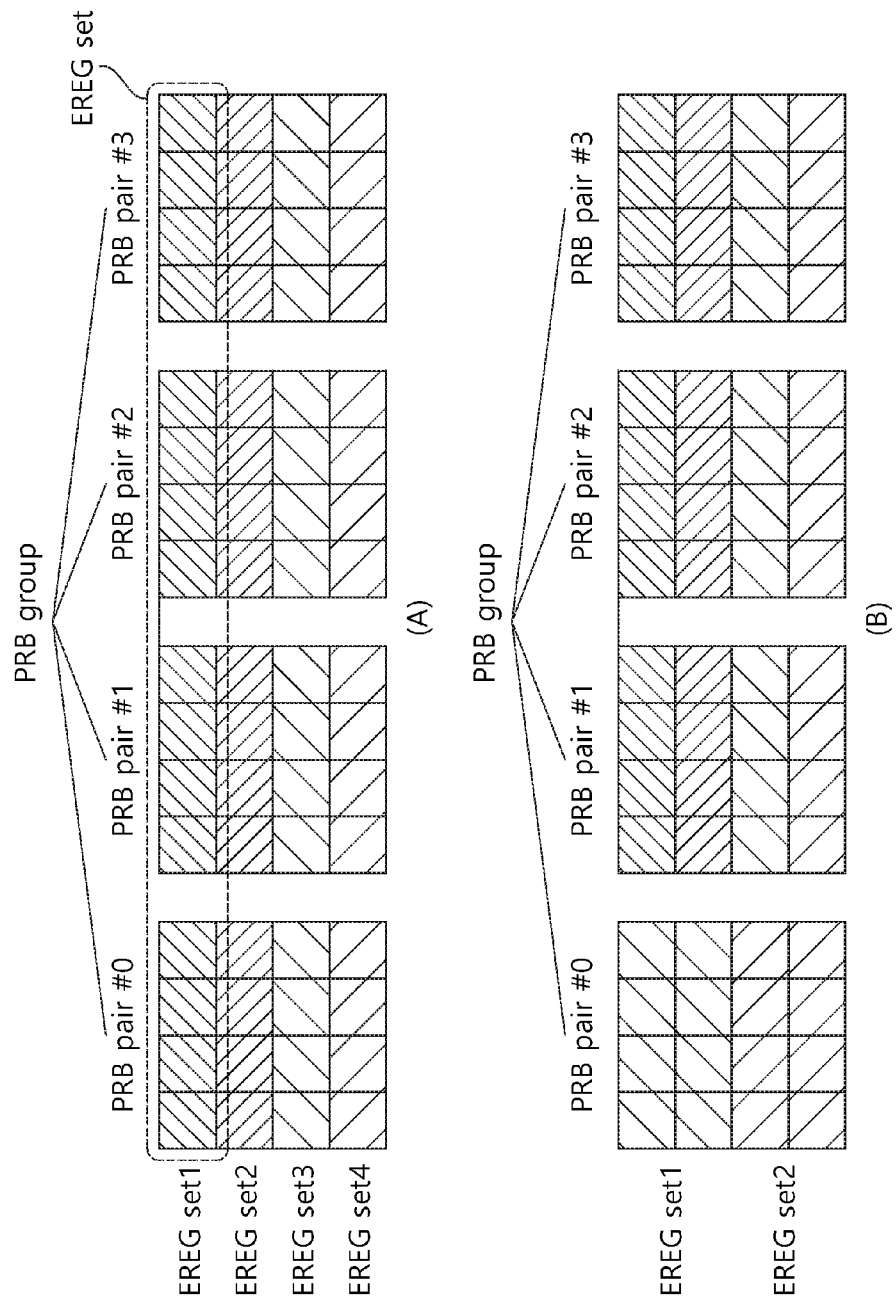
FIG. 8 is a view illustrating an example of a PRB pair structure.

FIG. 8 illustrates an example of a PRB pair structure.

A PRB group includes four PRB pairs but the number is not limited.

(A) of FIG. 8 illustrates an EREG set when an ECCE includes 4 EREGs. (B) of FIG. 8 includes an EREG set when an ECCE includes 8 EREGs.

Hereinafter, it is assumed that an ECCE includes 4 EREGs, unless otherwise mentioned.

An EPDCCH supports localized transmission and distributed transmission. In the localized transmission, EREGs forming one ECCE are transmitted in one PRB pair. In the distributed transmission, EREGs forming one ECCE are transmitted in a plurality of PRB pairs.

Figure 9:
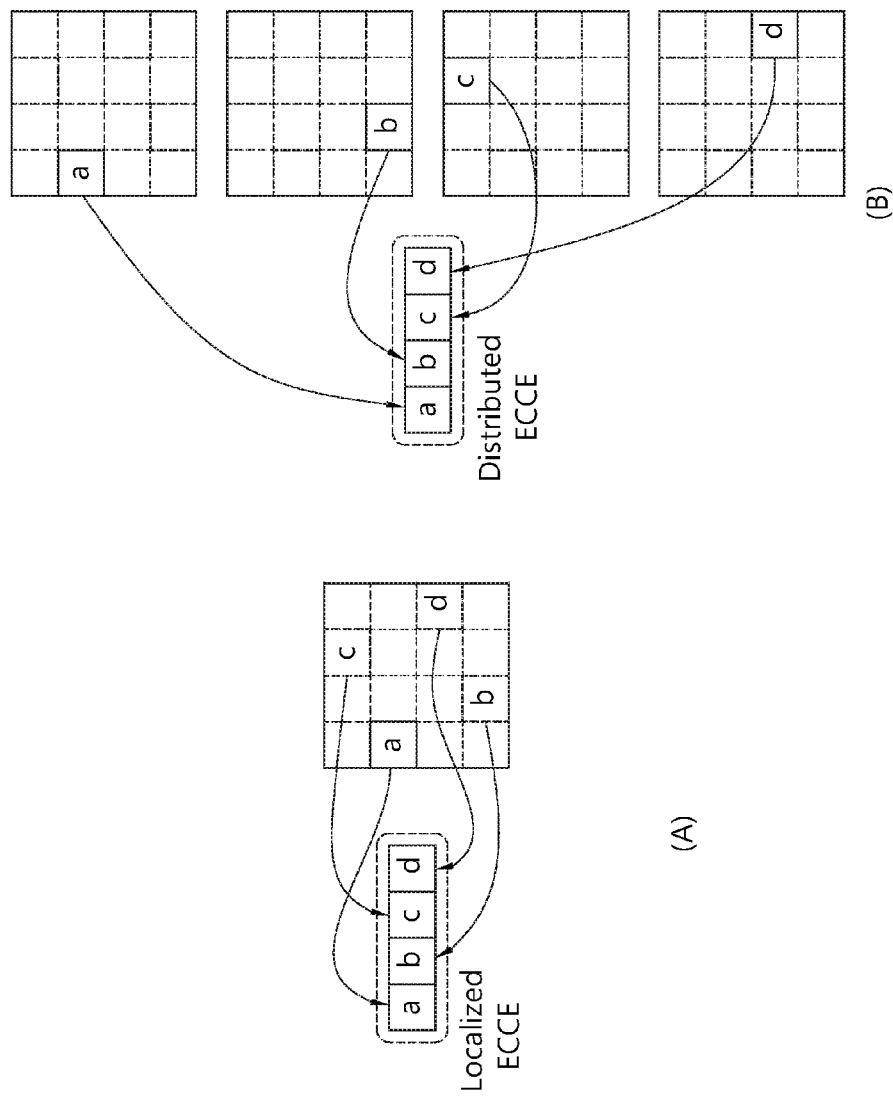
FIG. 9 is a view illustrating an example of localized transmission and distributed transmission.

FIG. 9 illustrates an example of localized transmission and distributed transmission.

(A) of FIG. 9 illustrates an example of ECCE-to-EREG mapping according to localized transmission. A localized ECCE refers to an ECCE used in localized transmission. (B) of FIG. 9 illustrates an example of ECCE-to-EREG mapping according to distributed transmission. A distributed ECCE refers to an ECCE used in configuring a distributed ECCE.

An EREG aggregate refers to an aggregate of EREGs used to form a located ECCE or a distributed ECCE. That is, an ECCE may include EREGs that belong to the same EREG aggregate.

Unlike a PDCCH demodulated on the basis of a CRS to obtain a precoding gain, an EPDCCH is demodulated on the basis of a DMRS.

Figure 10:
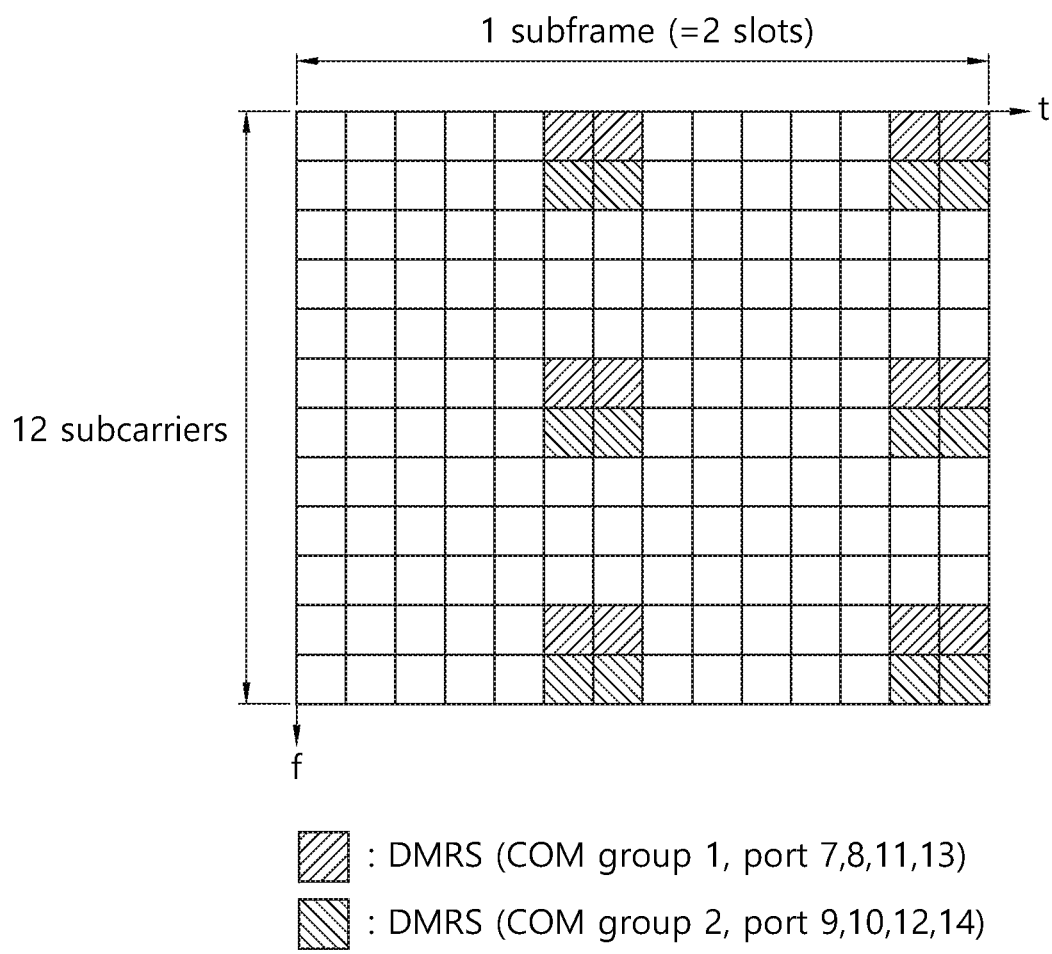
FIG. 10 is a view illustrating an example of RE mapping for a DM RS.

FIG. 10 illustrates an example of RE mapping for a DM RS.

The DM RS may perform channel estimation by a method according to a value of a spreading factor K. In a regular CP, a spreading factor K is 4 (K=4), and FIG. 10 illustrates RE mapping in a regular CP. In an expended CP, the spreading factor K is 2 (K=2).

When an antenna port for DM RS is p531 {107, 108, 109, 110}, an example of a spreading sequence with a spreading factor of K=4 is as follows.

TABLE 1

| Antenna port p | [$w_p(0)$ $w_p(1)$ $w_p(2)$ $w_p(3)$] |
| --- | --- |
| 107 | [+1 +1 +1 +1] |
| 108 | [+1 −1 +1 −1] |
| 109 | [+1 +1 +1 +1] |
| 110 | [+1 −1 +1 −1] |

When an RS sequence $r_{ns}(m)$ is mapped to a symbol $a^{(p)}_{k,l}$ by PRB $n_{PRB}$, RE mapping may be expressed by Equation 1 below.

$$a_{k,l}^{(p)} w_p(l') \cdot r(3 \cdot l' \cdot N_{RB}^{max,DL} + 3 \cdot n_{PRB} + m') \quad [\text{Equation 1}]$$

Here, $$w_p(i) = \begin{cases} \overline{w}_p(i) & (m' + n_{PRB}) \bmod 2 = 0 \\ \overline{w}_p(3-i) & (m' + n_{PRB}) \bmod 2 = 1 \end{cases}$$

$$k = 5m' N_{sc}^{RB} n_{PRB} + k'$$

$$k' = \begin{cases} 1 & p \in \{107, 108\} \\ 0 & p \in \{109, 110\} \end{cases}$$

$l = l' \bmod 2 + 5$ if not in a special subframe $$l' = \begin{cases} 0, 1 & \text{if } n_s \bmod 2 = 0 \text{ and not in special subframe} \\ 2, 3 & \text{if } n_s \bmod 2 = 1 \text{ and not in special subframe} \end{cases}$$

$m' = 0, 1, 2$

An example of a spreading sequence with a spreading factor of K=2 is as follows.

TABLE 2

| Antenna port p | [$w_p(0)$ $w_p(1)$] |
| --- | --- |
| 107 | [+1 +1] |
| 108 | [−1 +1] |

As can be seen from Table 1 and Table 2, when antenna port p is p∈{107, 108, 109, 110}, the wireless device recognizes that the spreading factor is 4, and when antenna port p is p∈{107, 108}, the wireless device recognizes that the spreading factor is 2. When the spreading factor is 2, the wireless device may despread a DM RS of a first slot and a DM RS of a second slot by a spreading sequence with K=2 and subsequently estimate a channel through time interpolation. When K is 4, a channel may be estimated by dispreading the entire subframes by the spreading sequence with K=4. A channel estimation process is varied according to spreading factors. When K=2 is used, a gain may be obtained from high mobility through time interpolation. When K=4 is used, more wireless devices or larger ranks may be advantageously supported.

Figure 11A:
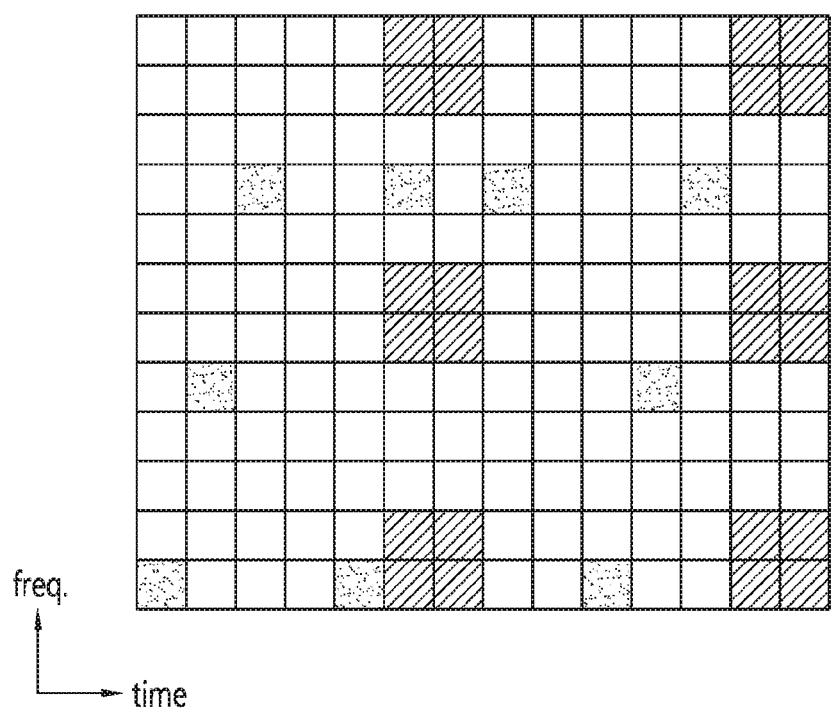
FIGS. 11A and 11B are view illustrating the way in which REs are included in one EREG in an EPDCCH.
Figure 11B:
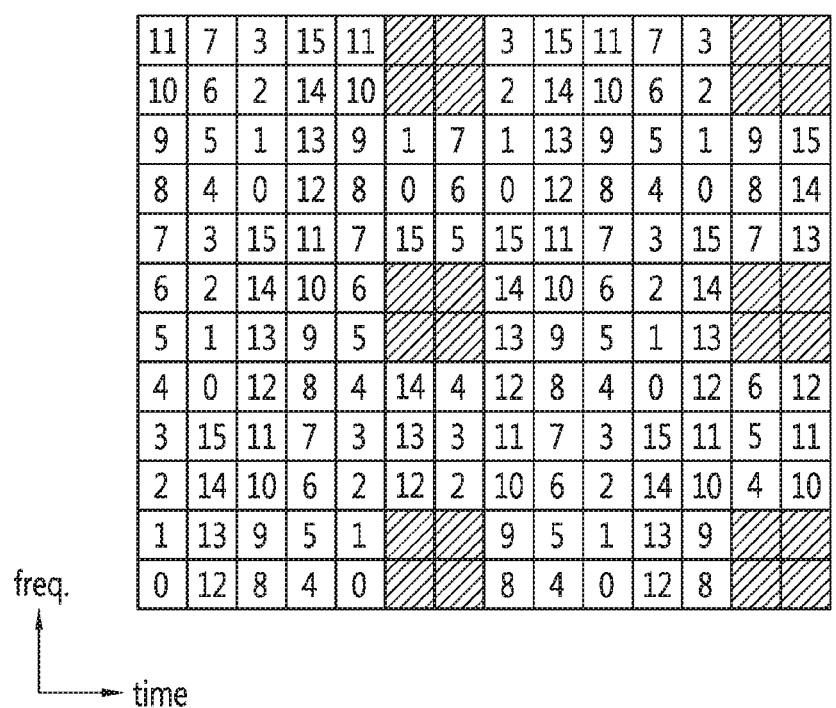

FIGS. 11A and 11B illustrate a way in which REs are included in one EREG of an EPDCCH.

As illustrated in FIG. 11A, REs included in one EREG of the EPDCCH are indicated by the same numbers. For example, 9 REs indicated by 0 are included in one EREG as illustrated in FIG. 11B. Here, in the RE mapping of EREG, RE resource in which a DMRS is transmitted is excluded.

<MTC (Machine Type communication)>

Hereinafter, MTC will be described.

Figure 12A:
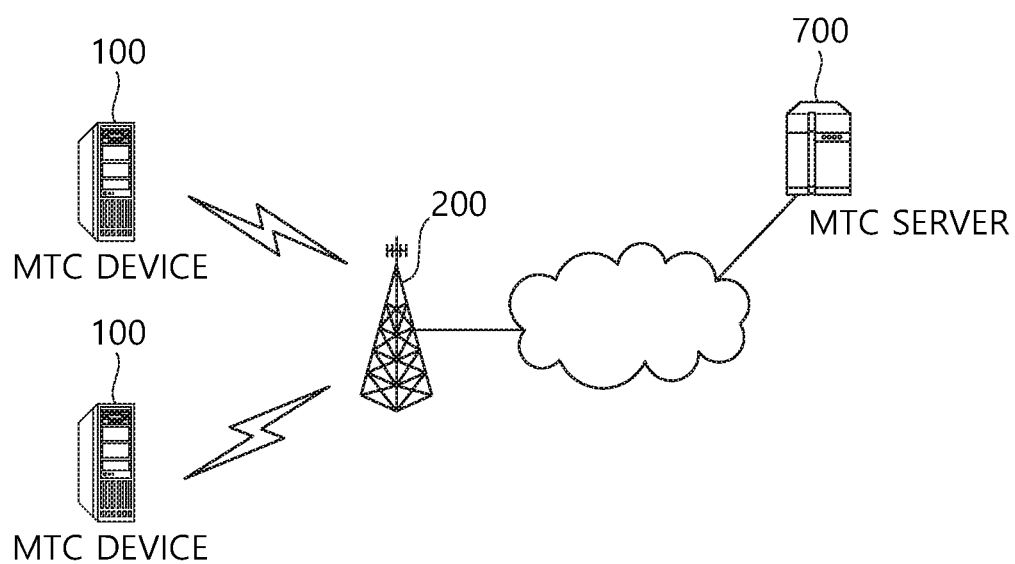
FIG. 12A is a view illustrating an example of machine type communication (MTC).

FIG. 12A illustrates an example of MTC.

MTC refers to information exchange between MTC devices 100 through a BS 200 without human interaction or information exchange between the MTC device 100 and an MTC server 700 through a BS.

The MTC server 700 is an entity communicating with the MTC device 100. The MTC server 700 executes an MTC application and provides an MTC-specific service to the MTC device.

The MTC device 100 is a wireless device providing MTC communication, which may be fixed or mobile.

A service provided through MTC is different from a legacy service of communication in which a person intervenes, and various categories of service such as tracking, metering, payment, a medical field service, remote controlling, and the like, are provided. In detail, a service provided through MTC may include reading a meter, measuring a water level, utilization of a monitoring camera, report of an inventory of a vending machine, and the like.

As the MTC device has characteristics in that a transmission data amount is small and transmission/reception of uplink/downlink data occurs occasionally, it is effective to reduce cost and battery consumption of the MTC device according to a low data rate. The MTC device has small mobility, having characteristics that a channel environment rarely changes.

Figure 12B:
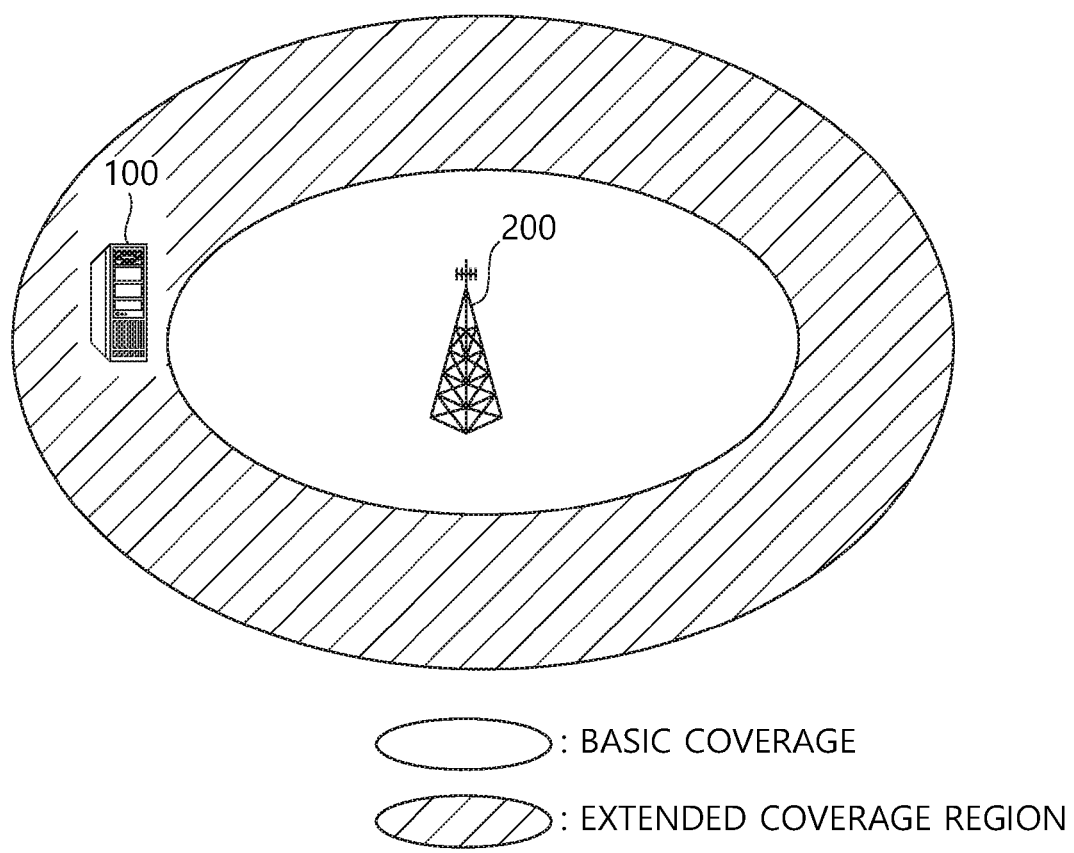
FIG. 12B is a view illustrating extension of cell coverage for an MTC device.

FIG. 12B illustrates extending of cell coverage for an MTC device.

Recently, extending cell coverage of a BS for the MTC device 100 is considered and various techniques are discussed.

Figure 13A:
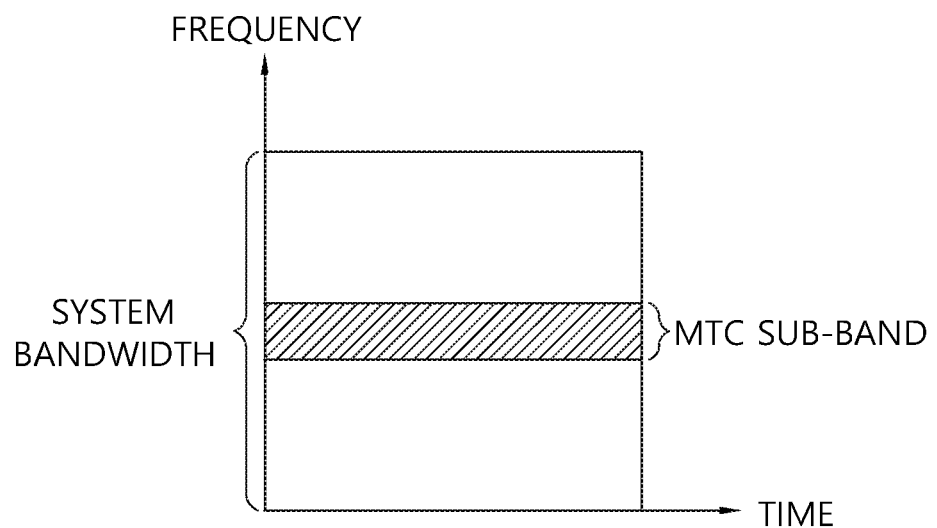
FIGS. 13A and 13B are views illustrating an example of a sub-band in which an MTC device operates.
Figure 13B:
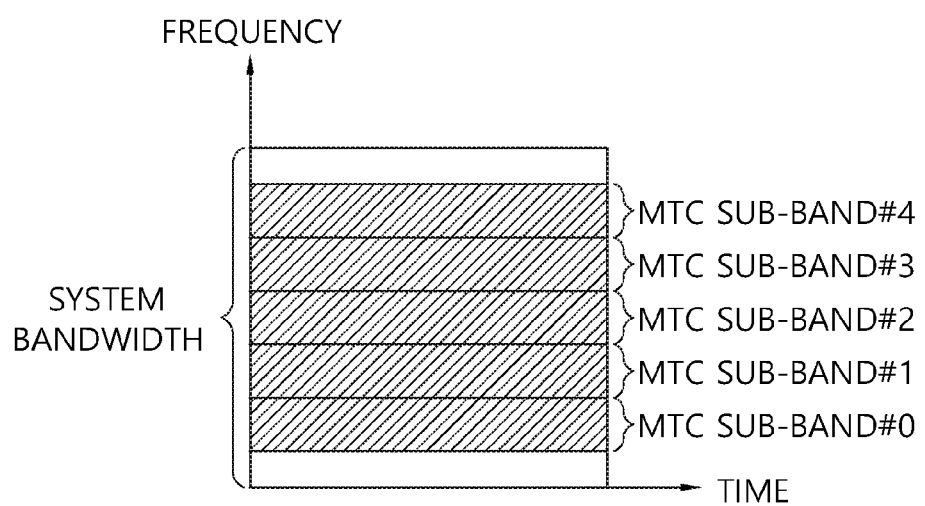

FIGS. 13A and 13B are views illustrating examples of sub-bands in which an MTC device operates.

In order to reduce cost of an MTC device, the MTC device may use a sub-band of about 1.4 MHz, for example, regardless of system bandwidth of a cell as illustrated in FIG. 13A.

Here, a region of the sub-band in which the MTC device operates may be positioned in a central region (e.g., six central PRBs) of a system bandwidth of a cell as illustrated in FIG. 13A.

Or, as illustrated in FIG. 13B, sub-bands of the MTC device may be placed in a single frame for multiplexing within a subframe between MTC devices so that the MTC devices may use different sub-bands or may use the same sub-band but use different sub-bands not in the six central PRB regions.

In this case, the MTC device may not properly receive a legacy PDCCH transmitted in the entire system band. Also, it may not be desirable for a PDCCH for an MTC device to be transmitted in an OFDM symbol region in which a legacy PDCCH is transmitted due to a multiplexing issue with the PDCCH transmitted to a different MTC device.

Embodiment of Present Disclosure

Thus, an embodiment of the present disclosure provides a method for solving such a problem.

In detail, an embodiment of the present disclosure proposes an introduction of a separate control channel for an MTC device within a sub-band in which the MTC device operates, as a method for solving the aforementioned problem.

Hereinafter, a downlink control channel for a low-cost MTC device using only some sub-bands, rather than the entire system band of a cell, will be termed a new EPDCCH (referred to as an "N-PDCCH") or an MTC-dedicated EPDCCH (hereinafter, referred to as an "M-PDCCH").

The N-EPDCCH (or the M-EPDCCH) may use a configuration of the legacy EPDCCH as is. Or, the N-EPDCCH (or M-EPDCCH) may have a modified configuration of a legacy EPDCCH. However, the N-EPDCCH may basically follow all the characteristics of the legacy EPDCCH as is.

Hereinafter, in this disclosure, it is assumed that the N-EPDCCH is used for an MTC device, but the present disclosure may also be applied to a case in which the N-EPDCCH is used for a general UE, rather than the MTC device.

Hereinafter, a reference signal, ECCE-to-EREG mapping, EREG to RE mapping, SFBC, and the like, for the N-EPDCCH (or M-EPDCCH) proposed in this embodiment will be described.

I. Reference Signal for N-EPDCCH (or M-EPDCCH)

Channel estimation may be performed on the basis of a DMRS as in the legacy EPDCCH in order to demodulate the N-EPDCCH (or M-EPDCCH) proposed in the present disclosure, or performing channel estimation on the basis of a CRS as in the legacy PDCCH may also be taken into consideration. It may not be desirable for an MTC device to have both capability of performing CRS-based channel estimation and capability of performing DMRS-based channel estimation in terms of cost reduction of the MTC device.

For example, for the MTC device, only CRS-based channel estimation may be supported.

Unlike the legacy EPDCCH, when it is considered that CRS-based channel estimation is performed and used to demodulate the N-EPDCCH (or M-EPDCCH), the N-EPDCCH (or M-EPDCCH) may be configured as follows. Here, for the purposes of descriptions, an N-EPDCCH (or M-EPDCCH) demodulated using CRS-based channel estimation is termed a CRS-based N-EPDCCH (or M-EPDCCH). Also, an N-EPDCCH (or M-EPDCCH) using DMRS-based channel estimation will be referred to as a DMRS-based N-EPDCCH (or M-EPDCCH). Also, an N-EPDCCH (or M-EPDCCH) using both CRS and DMRS will be referred to as a CRS and/or DMRS-based N-EPDCCH (or M-EPDCCH).

I-1. CRS-Based N-EPDCCH (or M-EPDCCH)

In the case of the CRS-based N-EPDCCH (or M-EPDCCH), since an EPDCCH operates on the basis of CRS-based channel estimation, the EDPCCH should be transmitted using an antenna port used by a CRS. That is, the N-EPDCCH (or M-EPDCCH) may be transmitted through the entirety or a portion of antenna ports 0, 1, 2, and 3.

In a case where the N-EPDCCH (or M-EPDCCH) is channel-estimated/demodulated using only a CRS, an MTC device may be able always to expect a CRS in a subframe in which the N-EPDCCH (or M-EPDCCH) is transmitted.

Thus, an EREG to RE mapping scheme designed in consideration of only a current DMRS may be changed to a mapping scheme considering a CRS. An example of such a new EREG-to-RE mapping is mentioned in Paragraph III.

In the case of the CRS-based N-EPDCCH (or M-EPDCCH), it is difficult for the MTC device to know a precoding matrix used for N-EPDCCH (or M-EPDCCH) in advance. Thus, the N-EPDCCH (or M-EPDCCH) may be transmitted in a transmit diversity scheme in which an EPDCCH can be received although the MTC device does not know the precoding matrix. In this case, the CRS-based N-EPDCCH (or M-EPDCCH) may be transmitted through an SFBC technique. A method for applying such an SFBC and contents regarding an antenna port configuration are mentioned in Paragraph IV of the present disclosure. When the CRS-based N-EPDCCH (or M-EPDCCH) is used, the N-EPD- CCH (or M-EPDCCH) may be transmitted using the entirety or a portion of antenna ports 0, 1, 2, and 3.

Meanwhile, in a case where channel estimation/demodulation is performed using only a CRS for receiving the N-EPDCCH (or M-EPDCCH), the MTC device should be able to always expect a CRS in a subframe in which the N-EPDCCH (or M-EPDCCH) is received. Thus, in order to transmit the N-EPDCCH (or M-EPDCCH) in an MBSFN subframe, a CRS or a reference signal (RS) having the same structure as that of the CRS should be received. However, such an RS should be transmitted in a partial narrow band of the entire system band of a cell. Hereinafter, such an RS will be termed a narrow-CRS (CRS transmitted only in a specific PRB). A transmission subframe of the narrow-CRS may be as follows.

Narrow-CRS may be transmitted to the MTC device in a subframe in which the N-EPDCCH (or M-EPDCCH) is transmitted, among MBSFN subframes.

The narrow-CRS may be transmitted in a subframe in which the MTC device monitors the N-EPDCCH (or M-EPDCCH), among MBSFN subframes.

That is, such a narrow-CRS is transmitted in the same manner as that of a legacy CRS, but may be limited only in a transmission resource region. The narrow-CRS may be transmitted through a non-PDCCH transmission region in a time axis, and may be transmitted through only some subframes.

The narrow-CRS may be transmitted through a frequency resource domain narrower than the legacy CRS in a frequency axis. The narrow-CRS may be transmitted in the MBSFN subframe for the MTC device to receive the N-EPDCCH (or M-EPDCCH) (and/or PDSCH). A transmit frequency region of the narrow-CRS may be as follows.

The narrow-CRS may be transmitted in a reduced bandwidth in which the MTC device operates in the entire system band of a cell. That is, the MTC device may assume that the narrow-CRS is transmitted through every frequency region of a reduced band region in which the MTC device operates.

Narrow-CRS may be transmitted through a PRB region (i.e., a PRB resource position to which the N-EPDCCH (or M-EPDCCH) may be matched) corresponding to an EPDCCH-PRB-set regarding the N-EPDCCH (or M-EPDCCH). That is, the MTC device may assume that the narrow-CRS is transmitted in a PRB region corresponding to an EPDCCH-PRB-set regarding the N-EPDCCH (or M-EPDCCH) (or a PRB resource position to which the N-EPDCCH (or M-EPDCCH) may be mapped).

Alternatively, the MTC device may assume that the narrow-CRC is also transmitted from a BS only in a PRB region in which the N-EPDCCH is actually transmitted from the BS.

Since the narrow-CRS is not transmitted through the entire frequency band, it may be transmitted with power higher than that of the legacy CRS. Thus, the narrow-CRS may be power-boosted and transmitted, compared with transmission of the legacy CRS.

I-2. CRS and/or DMRS-Based N-EPDCCH (or M-EPDCCH)

An MTC device requiring coverage enhancement, among MTC devices, is required to reduce the number of subframes in which the N-EPDCCH (or M-EPDCCH) is transmitted by increasing channel estimation performance. Thus, channel estimation/demodulation may be performed using a CRS and/or DMRS in order to receive the N-EPDCCH (or M-EPDCCH).

I-2-1. Transmission Antenna Port of N-EPDCCH (or M-EPDCCH)

In the case of the CRS and/or DMRS-based N-EPDCCH (or M-EPDCCH), a DMRS is required to be used for channel estimation, and thus, a transmission antenna port of the DMRS and a transmission antenna port of the N-EPDCCH (or M-EPDCCH) may be as follows.

In a first example, the DMRS and the N-EPDCCH (or M-EPDCCH) are transmitted through antenna ports 0, 1, 2, and 3, instead of antenna ports 107, 108, 109, and 110.

In a second example, the DMRS and the N-EPDCCH (or M-EPDCCH) are transmitted through antenna ports 0 and 1, instead of antenna ports 107 and 109. Also, the DMRS and the N-EPDCCH (or M-EPDCCH) are transmitted through antenna ports 2 and 3, instead of the legacy antenna ports 108 and 110.

In a third example, antenna ports 107, 108, 109, and 110 in which the DMRS and the N-EPDCCH (or M-EPDCCH) are transmitted may be in a quasi co-located (QC) relation with the antenna ports 0, 1, 2, and 3, respectively.

In a fourth example, the antenna ports 107 and 109 in which the DMRS and the N-EPDCCH (or M-EPDCCH) are transmitted may be in a QC relation with the antenna ports 0 and 1, respectively. Also, the antenna ports 108 and 110 in which the DMRS is transmitted may be in a QC relation with the antenna ports 2 and 3, respectively.

Meanwhile, in the case of the CRS and/or DMRS-based N-EPDCCH (or M-EPDCCH), transmission antenna ports of the DMRS and the N-EPDCCH (or M-EPDCCH) may differ according to a transmission technique of the -EPDCCH (or M-EPDCCH). For example, transmission antenna ports of the DMRS and the N-EPDCCH (or M-EPDCCH) may be as follows.

In a first example, when localized transmission is performed on the N-EPDCCH, the DMRS/N-EPDCCH (or M-EPDCCH) are transmitted through the antenna ports 0, 1, 2, and 3, instead of the antenna ports 107, 108, 109, and 110. In a case where distributed transmission is performed on the N-EPDCCH, the DMRS/N-EPDCCH (or M-EPDCCH) are transmitted through the antenna ports 0 and 1, instead of the antenna ports 107 and 109.

In a second example, when localized transmission is performed on the N-EPDCCH, the DMRS/N-EPDCCH (or M-EPDCCH) are transmitted through the antenna ports 0, 1, 2, and 3, instead of the antenna ports 107, 108, 109, and 110. In a case where distributed transmission is performed on the N-EPDCCH, the DMRS/N-EPDCCH (or M-EPDCCH) are transmitted through the antenna ports 0 and 2, instead of the antenna ports 107 and 109.

In a third example, in a case where localized transmission is performed on the N-EPDCCH, the antenna ports 107, 108, 109, and 110 in which the DMRS/N-EPDCCH (or M-EPDCCH) are transmitted may be in a QC relation with the antenna ports 0, 1, 2, and 3, respectively. In a case where distributed transmission is performed on the N-EPDCCH, the antenna ports 107 and 109 in which the DMRS/N-EPDCCH (or M-EPDCCH) are transmitted may be in a QC relation with the antenna ports 0 and 1, respectively.

In a fourth example, in a case where localized transmission is performed on the N-EPDCCH, the antenna ports 107, 108, 109, and 110 in which the DMRS/N-EPDCCH (or M-EPDCCH) are transmitted may be in a QC relation with the antenna ports 0, 1, 2, and 3, respectively. In a case where distributed transmission is performed on the N-EPDCCH, the antenna ports 107 and 109 in which the DMRS/N-EPDCCH (or M-EPDCCH) are transmitted may be in a QC relation with the antenna ports 0 and 2, respectively.

Meanwhile, in a case where channel estimation/demodulation is performed on the N-EPDCCH (or M-EPDCCH) using the CRS and/or the DMRS, the MTC device should be able always to expect the CRS and the DMRS in a subframe in which the N-EPDCCH (or M-EPDCCH) is transmitted. Or, the MTC device may assume that only the CRS or the DMRS is present according to a position of a subframe. Thus, the EREG to RE mapping scheme designed in consideration of only the current DMRS may be changed to a mapping method in consideration of the CRS and/or the DMRS. An example of the new EREG-to-RE mapping is mentioned in Paragraph III.

I-2-2. Precoding Matrix Used in N-EPDCCH (or M-EPDCCH)

Meanwhile, in the case of the CRS and/or DMRS-based N-EPDCCH (or M-EPDCCH), it is difficult for the MTC device to know a precoding matrix used for the N-EPDCCH (or M-EPDCCH) in advance. Thus, the N-EPDCCH (or M-EPDCCH) may be transmitted through a transmit diversity scheme in which the EPDCCH may be received although the MTC device does not know the precoding matrix. In this case, the CRS and/or the DMRS-based N-EPDCCH (or M-EPDCCH) may be transmitted through an SFBC technique. Contents regarding a method for applying such an SFBC is mentioned in Paragraph IV of the present invention.

I-2-2-1. Method for Informing about Precoding Matrix when Localized Transmission is Performed on N-EPDCCH (or M-EPDCCH)

First, in a case where localized transmission is performed on the CRS and/or DMRS-based N-EPDCCH (or M-EPDCCH), the following method may be considered in order to allow the MTC device to know a precoding matrix used for transmission of the N-EPDCCH (or M-EPDCCH). The following contents may also be applied in the same manner to transmit a CRS-based N-EPDCCH (or M-EPDCCH).

Figure 14:
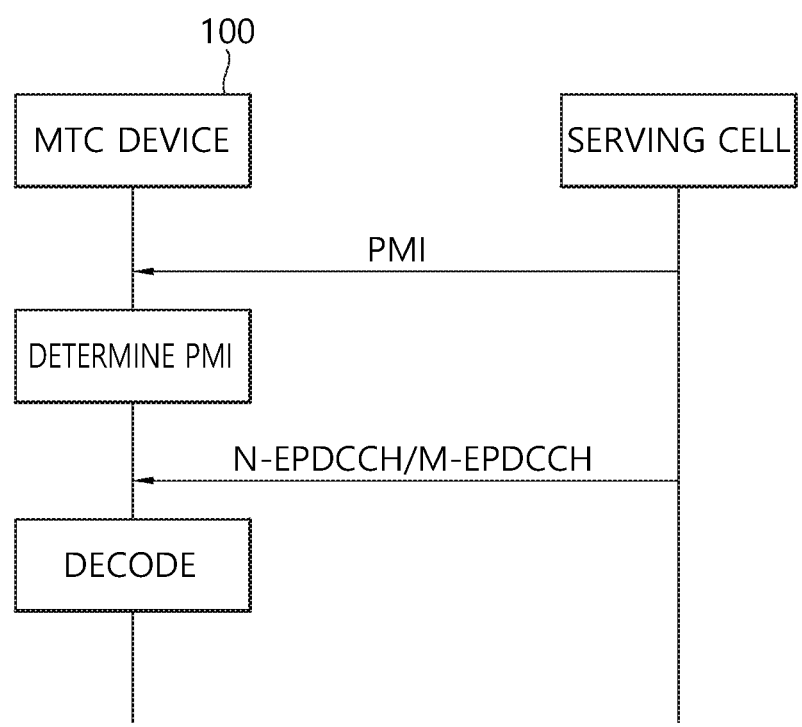
FIG. 14 is a view illustrating an example in which a BS (or an eNB) configures a precoding matrix used for transmission of an N-EPDCCH (or an M-EPDCCH) to an MTC device.

FIG. 14 is a view illustrating an example in which a BS configures a precoding matrix used for transmission of N-EPDCCH (or M-EPDCCH), to an MTC device.

As illustrated in FIG. 14, the MTC device may receive configured information regarding an index of precoding matrix (PMI) used for transmission of the N-EPDCCH (or M-EPDCCH) from a BS. Here, such a configuration may be received from the BS through an RRC signal (or a DCI).

The MTC device may determine a PMI applied to the N-EPDCCH (or M-EPDCCH) on the basis of the information.

It may be assumed that the MTC device receives a configured index of one precoding matrix from the BS and the corresponding precoding matrix is used for transmission of the N-EPDCCH (or M-EPDCCH). Here, it may be assumed that the configured precoding matrix is applied in the same manner to every PRB region in which the N-EPDCCH (or M-EPDCCH) is transmitted and a subframe region.

Meanwhile, the precoding matrix used for transmission of the N-EPDCCH (or M-EPDCCH) may be varied in every PRB or bundle of PRBs. In this case, the BS may configure the precoding matrix used for transmission of the N-EPDCCH (or M-EPDCCH) in each PRB (or PRB bundle) to the MTC device. For example, in a case where a size of a PRB bundle to which the same precoding matrix is applied is 2 and a size of a PRB in which the N-EPDCCH (or M-EPDCCH) is transmitted is 6, the MTC device may receive three precoding matrices used for a total of three PRB bundles from the BS.

I-2-2-2. Method for Informing about Precoding Matrix when Distributed Transmission is Performed on N-EPDCCH (or M-EPDCCH)

On the other hand, in a case where distributed transmission is performed on the CRS and/or DMRS-based N-EPDCCH (or M-EPDCCH), the following methods may be considered in order to allow the MTC device to know a precoding matrix used for transmission of the N-EPDCCH (or M-EPDCCH). A precoding matrix used for transmission of a DMRS associated with the N-EPDCCH (or M-EPDCCH) may also be determined in the following manner. The following contents may also be applied in the same manner to transmission of a CRS-based N-EPDCCH (or M-EPDCCH).

(1) First Method

In a first method, the MTC device may know a precoding matrix used for transmission of the N-EPDCCH (or M-EPDCCH) by a portion or the entirety of the following parameters.

Sub-band index: A precoding matrix applied to transmission of the N-EPDCCH (or M-EPDCCH) may be determined by an index indicating a position of a sub-band in which the MTC device operates in the entire system band of a cell. Thus, an index of the precoding matrix may be varied according to an index indicating a position of the sub-band in which the MTC device operates. Or, a precoding matrix applied to transmission of the N-EPDCCH (or M-EPDCCH) may be determined by a lowest (or highest) PRB index among PRB regions in which the N-EPDCCH (or M-EPDCCH) is transmitted.

PRB index (or index of PRB bundle): A precoding matrix used for transmission of the N-EPDCCH (or M-EPDCCH) may be varied in every PRB or PRB bundle. In this case, a precoding matrix used for transmission of the N-EPDCCH (or M-EPDCCH) in each PRB (or PRB bundle) may be determined by a PRB index (or an index of a PRB bundle). In a case where the precoding matrix used for transmission of the N-EPDCCH (or M-EPDCCH) is varied in every PRB or PRB bundle, a precoding matrix used in the corresponding PRB bundle may be determined by a lowest (or highest) PRB index in the PRB regions forming the PRB bundle.

Antenna port index: A precoding matrix used for transmission of the N-EPDCCH (or M-EPDCCH) may be determined by a transmission antenna port index of the N-EPDCCH (or M-EPDCCH).

Subframe index: A precoding matrix used for transmission of the N-EPDCCH (or M-EPDCCH) may be varied in every subframe (or in each of a plurality of subframes or in each of a plurality of subframe bundles. In this case, a precoding matrix used for transmission of the N-EPDCCH (or M-EPDCCH) in each subframe (or in subframe bundle) may be determined by a subframe index (or an index of a subframe bundle). In a case where a precoding matrix used for transmission of the N-EPDCCH (or M-EPDCCH) is varied in every subframe or every subframe bundle, a precoding matrix used for a corresponding subframe bundle may be determined by a lowest (or highest) subframe index among subframes of subframe bundles. The subframe index may be replaced by a system frame number (SFN).

ID of MTC device: A precoding matrix used for transmission of the N-EPDCCH (or M-EPDCCH) may be varied by an ID of an MTC device receiving the N-EPDCCH (or M-EPDCCH). Characteristically, in a case where the N-EPDCCH (or M-EPDCCH) is transmitted through a CSS, a cell ID, instead of an ID of the MTC device, may be used. Or, a RNTI value (e.g., SI-RNTI, P-RNTI, or RA-RNTI) at which the N-EPDCCH (or M-EPDCCH) is scrambled may be used.

In a case where distributed transmission is performed on the N-EPDCCH (or M-EPDCCH), a precoding matrix used for the N-EPDCCH (or M-EPDCCH) may be varied according to a current antenna port, a PRB position, and every subframe position. That is, it may be assumed that a precoding matrix used in the N-EPDCCH (or M-EPDCCH) is the same only in the same antenna port, PRB position, and subframe position in the MTC device. In order to maintain the determination form of the precoding matrix, the precoding matrix used for transmission of the N-EPDCCH (or M-EPDCCH) may be determined by an antenna port index, a PRB index, and a subframe index, for example. That is, when the MTC device knows the antenna port index, the PRB index, and the subframe index in which the N-EPDCCH (or M-EPDCCH) is transmitted, it may infer/determine a precoding matrix used for transmission of the N-EPDCCH (or M-EPDCCH) from the corresponding antenna port index, PRB index, and subframe index.

(2) Second Method

In a second method, the MTC device may receive a configured precoding matrix used for transmission of the N-EPDCCH (or M-EPDCCH) from the BS. For example, the MTC device may explicitly receive a configured index of a precoding index according to an antenna port, a PRB position, and/or subframe position in which the N-EPDCCH (or M-EPDCCH) is transmitted, from the BS.

In this case, a problem in that an amount of configuration information to be given by the BS to the MTC device is excessively increased may arise. Thus, in order to reduce the amount of configuration information, the BS may explicitly configure only a precoding matrix according to an antenna port to the MTC device. In this case, it may be assumed that a precoding matrix for the MTC device is varied only according to the antenna port and is the same, without being varied according to a PRB position and a subframe position.

Or, a plurality of precoding matrix patterns changing according to an antenna port, a PRB position, and/or a subframe position are present, and the BS may configure an index of a precoding matrix pattern to the MTC device. The index of the pattern may be transmitted through RRC signaling (or DCI).

(3) Third Method

In a third method, the precoding matrix used for transmission of the N-EPDCCH (or M-EPDCCH) may be determined by the same parameters as those of the first method described above and the precoding matrix may be varied by explicit signaling additionally received from the BS. That is, a precoding matrix used for the N-EPDCCH (or M-EPDCCH) may be determined by the parameters of the first method described above and the precoding matrix index configured through an RRC signal (or DCI) received from the BS. For example, in a case where the precoding matrix used in the N-EPDCCH (or M-EPDCCH) is varied in every antenna port index, PRB index, and subframe index, if the MTC device knows the antenna port index, the PRB index, and the subframe index in which the N-EPDCCH (or M-EPDCCH) is transmitted and the precoding matrix index configured by the BS, the MTC device may infer/determine the precoding matrix used for transmission of the N-EPDCCH (or M-EPDCCH) from the corresponding antenna port index, PRB index, and subframe index. In this case, although the N-EPDCCH (or M-EPDCCH) is transmitted through the same antenna port index, PRB index, and subframe index, the precoding matrix used for transmission of the N-EPDCCH (or M-EPDCCH) may be varied in the corresponding antenna port index, PRB index, and subframe index according to the precoding matrix index configured by the BS.

In a case where the N-EPDCCH (or M-EPDCCH) is channel-estimated/demodulated using a CRS and/or DMRS, the MTC device should be able always to expect the CRS and/or DMRS in the subframe in which the N-EPDCCH (or M-EPDCCH) is transmitted. Meanwhile, in the non-PDCCH transmission region of the current MBSFN subframe, the DMRS may be transmitted but the CRS may not be transmitted.

In a case where the MTC device always performs channel estimation/demodulation using the CRS and/or DMRS, the MTC device should be able to expect reception of the CRS and/or DMRS in the subframe in which the N-EPDCCH (or M-EPDCCH) is received. Thus, in a case where the N-EPDCCH (or M-EPDCCH) is transmitted in an MBSFN subframe, the BS should transmit the CRS and/or the DMRS in the MBSFN subframe. Transmission of the DMRS in the MBSFN subframe is not problematic but a general CRS cannot be transmitted in the MBSFN subframe. Thus, the MTC device may assume that the aforementioned narrow-CRS is received in order to receive the N-EPDCCH (or M-EPDCCH) in the MBSFN subframe.

In a case where transmission of the CRS is the same as that of the legacy case, the MTC device may use the CRS and/or DMRS in channel estimation/demodulation for receiving the N-EPDCCH (or M-EPDCCH) in a non-MBSFN subframe (in a subframe in which the CRS is transmitted). However, since the CRS is not received in the MBSFN subframe, the MTC device may perform channel estimation/demodulation for receiving the N-EPDCCH (or M-EPDCCH) only using the DMRS.

In a general subframe (i.e., a non-MBSFN subframe), both the CRS and the DMRS may be transmitted in a non-PDCCH transmission region in a general subframe (i.e., non-MBSFN subframe), but only the DMRS may be transmitted in a non-PDCCH transmission region in an MBSFN subframe. Thus, in the subframe (e.g., general subframe) in which the CRS is received, the N-EPDCCH (or M-EPDCCH) is received on the basis of the CRS (i.e., the CRS is used for channel estimation/demodulation for receiving the N-EPDCCH (or M-EPDCCH)), and in a subframe (e.g., an MBSFN subframe) in which the CRS cannot be received and only the DMRS is received, the N-EPDCCH (or M-EPDCCH) may be received on the basis of the DMRS (i.e., the DMRS is used for channel estimation/demodulation for receiving the N-EPDCCH (or M-EPDCCH)).

II. ECCE to EREG Mapping for N-EPDCCH (or M-EPDCCH)

First, ECCE to EREG mapping for a legacy EPDCCH will be described.

In a subframe i, ECCEs available for transmission of an EPDCCH within an EPDCCH set $s_m$ are numbered from 0 to $N_{ECCE,m,i}-1$. The ECCE numbers are as follows.

- As mapping for localized transmission, EREGs are numbered by $(n \bmod N_{RB}^{ECCE})+jN_{RB}^{ECCE}$ in a PRB index $\lfloor n/N_{RB}^{ECCE} \rfloor$.
- As mapping for distributed transmission, EREGs are numbered by $\lfloor n/N_{RB}^{S_m} \rfloor + jN_{RB}^{ECCE}$ in a PRB index $(n+j \max(1, N_{RB}^{S_m}/N_{ECCE}^{EREG})) \bmod N_{RB}^{S_m}$.

$j=0, 1, \ldots, N^{EREG}_{ECCE}-1$, and $N^{EREG}_{ECCE}$ is the number of EREGs per ECCE. Also, $N^{ECCE}_{RB}=16/N^{EREG}_{ECCE}$ is the number of ECCEs per pair of resource blocks.

The pair of resource blocks forming the EPDCCH set $S_m$ is numbered from 0 to $N_{RB}^{S_m}-1$ in an ascending order.

Meanwhile, in the case of an N-EPDCCH (or M-EPDCCH), ECCE to EREG mapping relation of two methods may be considered.

One is the mapping method for localized transmission as described above and the other is a mapping method for distributed transmission as described above.

In this embodiment, it is proposed that, in the case of the N-EPDCCH (or M-EPDCCH), both mapping of localized transmission and mapping of distributed transmission should be used for ECCE to EREG mapping, regardless of transmission type (e.g., localized transmission or distributed transmission). In this case, the BS may configure which of mapping of localized transmission and mapping of distributed transmission is to be used to transmit the N-EPDCCH (or M-EPDCCH) through higher layer signalling or SIB to the MTC device. Or, the MTC device may attempt to receive the N-EPDCCH (or M-EPDCCH) through blind decoding on the assumption that the N-EPDCCH (or M-EPDCCH) can be transmitted in both of the two methods. That is, for example, in a case where the N-EPDCCH (or M-EPDCCH) is transmitted through the SFBC method as described hereinafter in Paragraph IV below, both mapping of localized transmission and mapping of distributed transmission may be used in the mapping relation of the EREGs forming the ECCE of the N-EPDCCH (or M-EPDCCH).

III. EREG to RE Mapping for N-EPDCCH (or M-EPDCCH)

How REs are included in a single EREG in the legacy EPDCCH has been described above with reference to FIGS. 11A and 11B.

However, in a case where the MTC device uses only a partial sub-band of the entire system bandwidth for cost reduction, the MTC device cannot use a region of OFDM symbols transmitted for the legacy PDCCH.

Thus, the MTC device may operate on the assumption that a relatively small number of OFDM symbols (e.g., 12 OFDM symbols per subframe), compared with the legacy MTC device, is present. Also, in the case of considering a CRS-based N-EPDCCH (or M-EPDCCH), since a DMRS is not transmitted in the PRB region in which the N-EPDCCH (or M-EPDCCH) is transmitted, an RE resource region in which the DMRS is transmitted may not be considered when the N-EPDCCH (or M-EPDCCH) is transmitted.

Thus, the present disclosure newly proposes RE mapping of EREG within an RB for N-EPDCCH (or M-EPDCCH).

III-1. DMRS-Based N-EPDCCH (or M-EPDCCH)

In the case of a DMRS-based N-EPDCCH (or M-EPDCCH), RE mapping of an EREG may be performed in consideration of an OFDM symbol region in which a legacy PDCCH is transmitted.

For example, RE mapping of an EREG of N-EPDCCH (or M-EPDCCH) may be performed in consideration of the fact that three OFDM symbols are used for the legacy PDCCH. In this case, RE resource positioned in the OFDM symbols #0, #1, and #2 in which the legacy PDCCH is transmitted and RE resource in which the DMRS (DMRS for antenna ports 107, 108, 109, and 110) is transmitted may be excluded from the RE mapping of the EREG of the N-EPDCCH (or M-EPDCCH). That is, RE resource positioned in the OFDM symbols #0, #1, and #2 in which the legacy PDCCH is transmitted and RE resource in which the DMRS (DMRS for antenna ports 107, 108, 109, and 110) is transmitted may be excluded from the EREG.

In this case, a total of 108 REs per RB may be used for RE mapping of the EREG, and a total of 12 EREGs, each including 9 REs, per RB may be present.

III-2. CRS-Based N-EPDCCH (or M-EPDCCH)

In the case of CRS-based N-EPDCCH (or M-EPDCCH), RE mapping of the EREG may be performed in consideration of an OFDM symbol region in which the legacy PDCCH is transmitted and/or an RE resource region in which the CRS is transmitted.

(1) First Example

For example, RE mapping of the EREG of the N-EPDCCH (or M-EPDCCH) may be performed in consideration of that two OFDM symbols will be used for the legacy PDCCH. In this case, RE resource positioned in the OFDM symbols #0 and #1 in which the legacy PDCCH is transmitted may be excluded from the RE mapping of the EREG of the N-EPDCCH (or M-EPDCCH). That is, the RE resource positioned in the OFDM symbols #0 and #1 in which the legacy PDCCH is transmitted may be excluded from the EREG.

In such a case, a total of 144 REs per RB may be used for RE mapping of the EREG, and a total 16 EREGs, each including 9 REs, per RB may be present.

Figure 15A:
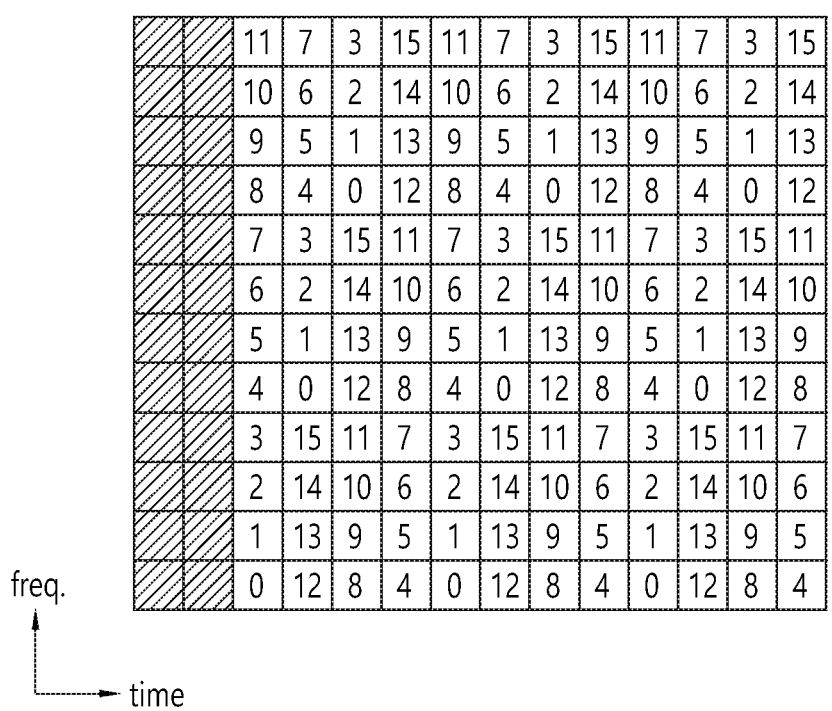
FIG. 15A is a view illustrating a first example regarding RE mapping of an EREG in a CRS-based N-EPDCCH (or M-EPDCCH).

FIG. 15A illustrates a first example regarding RE mapping of an EREG in a CRS-based N-EPDCCH (or M-EPDCCH).

In FIG. 15A, it is assumed that two OFDM symbols are present for a PDCCH.

For example, as illustrated in FIG. 15A, REs of an EREG may be included in an RB. In FIG. 15A, REs forming a single EREG are indicated by the same numbers.

When the EREG RE mapping technique is used, since the number of EREGs present within an RB and the number of REs forming the EREGs are the same as those of the legacy EPDCCH, complexity of implementation is reduced.

(2) Second Example

For example, RE mapping of an EREG of an N-EPDCCH (or M-EPDCCH) may be performed in consideration of the use of one OFDM symbol for the legacy PDCCH and in consideration of RE positions of a CRS port 0 and a CRS port 1. Here, RE resource positioned in the OFDM symbol #0 in which the legacy PDCCH is transmitted and RE resource in which the CRS port 0 and the CRS port 1 are transmitted may be excluded from the RE mapping of an EREG of an N-EPDCCH (or M-EPDCCH). That is, RE resource positioned in the OFDM symbol #0 in which the legacy PDCCH is transmitted and RE resource in which the CRS port 0 and the CRS port 1 are transmitted may be excluded from the EREG. Here, when the CRS is transmitted through the antenna ports 2 and 3, the N-EPDCCH (or M-EPDCCH) may be rate-matched and transmitted in the RE resource in which the CRS ports 2 and 3 are transmitted.

In such a case, a total of 144 REs per RB may be used for RE mapping of the EREG, and a total of 16 EREGs, each including 9 REs, per RB may be present.

Figure 15B:
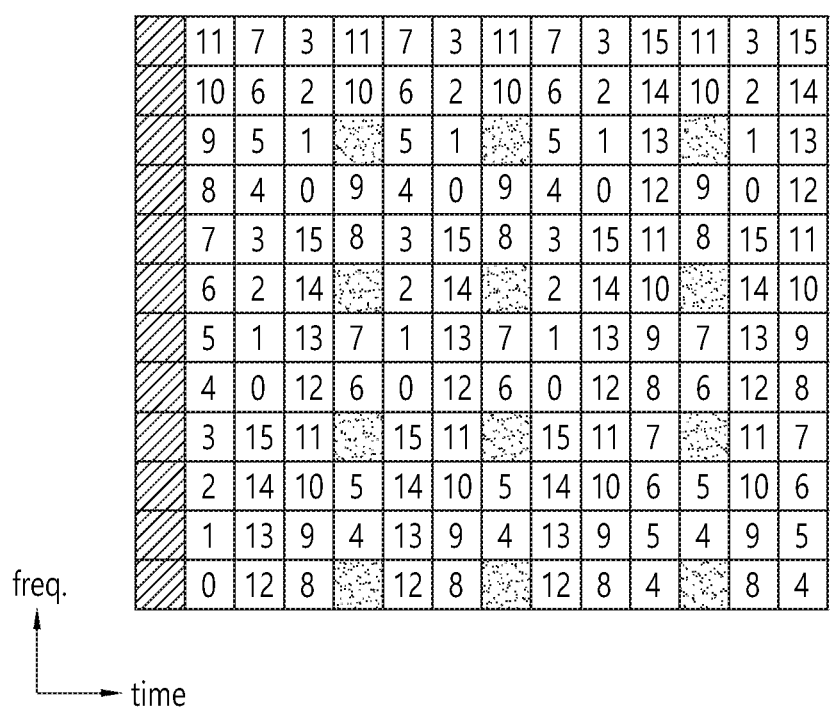
FIG. 15B is a view illustrating a second example regarding RE mapping of an EREG in a CRS-based N-EPDCCH (or M-EPDCCH).

FIG. 15B illustrates a second example regarding RE mapping of an EREG of a CRS-based N-EPDCCH (or M-EPDCCH).

In FIG. 15B, it is assumed that one OFDM symbol for a PDCCH is provided and a CRS is transmitted through one antenna port.

For example, in a case where a v-shift value of the CRS is 0, REs of an EREG may be configured within an RB as illustrated in FIG. 15B. In FIG. 15B, REs forming one EREG are indicated by the same number.

When the EREG RE mapping technique is used, since the number of EREGs present within an RB and the number of REs forming the EREGs are the same as those of the legacy EPDCCH, complexity of implementation is reduced. However, since a transmission RE position of the CRS is varied according to a physical cell ID/v-shift value, an RE position forming one EREG is varied according to a position of the CRS. Here, i) the EREG-to-RE mapping according to a position of the CRS may be newly mapped according to a rule such as "increasing order of first the subcarrier index and then the OFDM symbol index starting with the first slot and ending with the second slot" within a PRB in consideration of the changed CRS position. Also, ii) v-shift may be performed together with the EREG-to-REG mapping within the PRB by the v-shifted position of the CRS.

In this case, for example, when only the antenna port 0 is used for transmission of the CRS in a specific cell, nothing is transmitted in the RE position in which the CRS of the antenna port 1 is transmitted, wasting resource. Thus, in order to prevent such a waste of resource, the MTC device may be assumed as follows.

In a case where the CRS is transmitted only in the antenna port 0, the MTC device may assume that the CRS is transmitted through the antenna port 0 also in the RE region in which the CRS is transmitted through the antenna port 1.

Here, the above assumption may be made only in the OFDM symbol region in which the legacy PDCCH is not transmitted. Or, characteristically, the above assumption may be made only in an OFDM symbol region after an "OFDM symbol position in which transmission of the N-EPDCCH (or M-EPDCCH) configured for the MTC device through RRC signalling" starts.

(3) Third Example

RE mapping of the EREG of the N-EPDCCH (or M-EPDCCH) may be performed in consideration of the use of three OFDM symbols for the legacy PDCCH and in consideration of an RE position of the CRS port 0. In this case, RE resource positioned in the OFDM symbols #0, #1, and #2 in which the legacy PDCCH is transmitted and RE resource in which the CRS port 0 is transmitted may be excluded from the RE mapping of the EREG of the N-EPDCCH (or M-EPDCCH). That is, RE resource positioned in the OFDM symbols #0, #1, and #2 in which the legacy PDCCH is transmitted and RE resource in which the CRS port 0 is transmitted may be excluded from the EREG. Here, when the CRS is transmitted through the antenna ports 2 and 3, the N-EPDCCH (or M-EPDCCH) may be rate-matched and transmitted in the RE resource in which the CRS ports 1, 2, and 3 are transmitted.

In this case, a total of 108 REs per RB may be used for RE mapping of the EREG, and a total of 12 EREGs, each including 9 REs, per RB may be present.

Figure 15C:
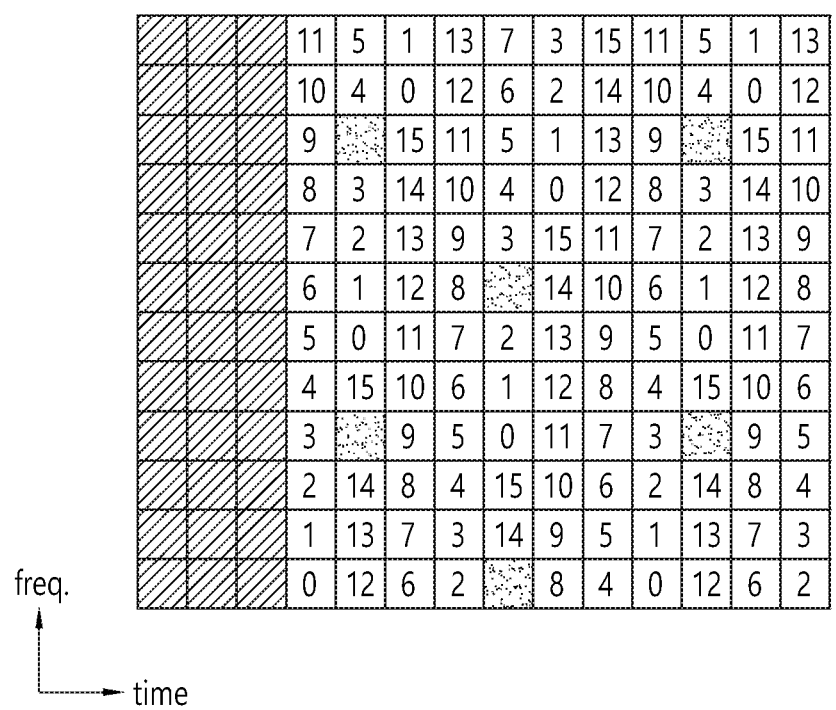
FIG. 15C is a view illustrating a third example regarding RE mapping of an EREG in a CRS-based N-EPDCCH (or M-EPDCCH).

FIG. 15C illustrates a third example regarding RE mapping of the EREG of the CRS-based N-EPDCCH (or M-EPDCCH)

In FIG. 15C, it is assumed that three OFDM symbols for a PDCCH are provided and one CRS is transmitted through one antenna port.

As illustrated in FIG. 15C, for example, when a v-shift value of a CRS is 0, REs of an EREG may be configured within an RB. In FIG. 15C, REs forming one EREG are indicated by the same number.

In this case, since a transmission RE position of the CRS is varied according to a physical cell ID/v-shift value, an RE position forming one EREG is varied according to a position of the CRS. Here, i) the EREG-to-RE mapping according to a position of the CRS may be newly mapped according to a rule such as "increasing order of first the subcarrier index and then the OFDM symbol index starting with the first slot and ending with the second slot" within a PRB in consideration of the changed CRS position. Also, ii) v-shift may be performed together with the EREG-to-REG mapping within the PRB by the v-shifted position of the CRS.

(4) Fourth Example

RE mapping of an EREG of an N-EPDCCH (or M-EPDCCH) may be performed in consideration of the use of zero (0) OFDM symbol for the legacy PDCCH and in consideration of RE positions of CRS ports 0, 1, 2, and 3. Here, RE resource in which the CRS ports 0, 1, 2, and 3 are transmitted may be excluded from the RE mapping of an EREG of an N-EPDCCH (or M-EPDCCH). That is, the RE resource in which the CRS ports 0, 1, 2, and 3 are transmitted may be excluded from the EREG.

In such a case, a total of 144 REs per RB may be used for RE mapping of the EREG, and a total of 16 EREGs, each including 9 REs, per RB may be present.

Figure 15D:
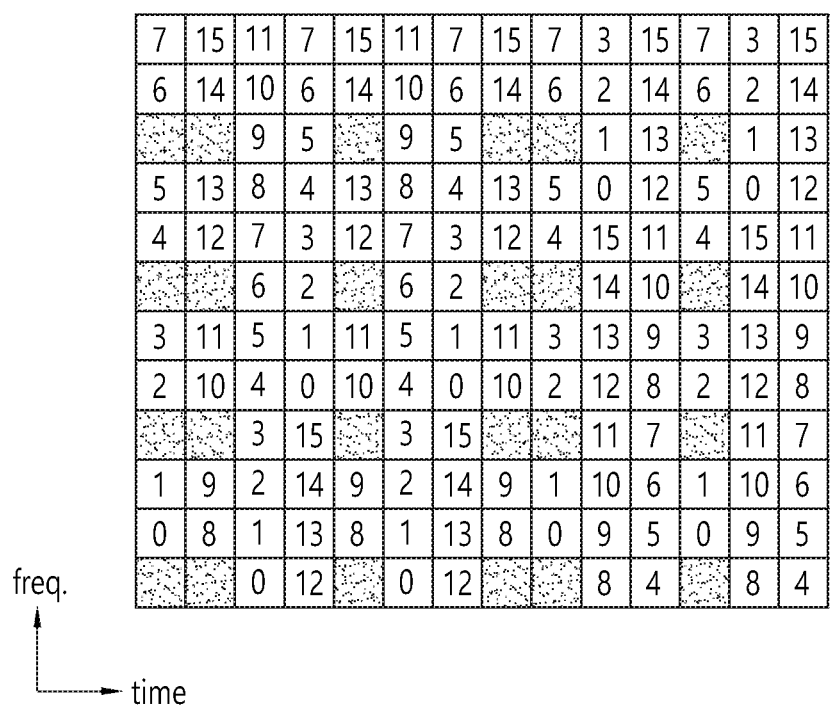
FIG. 15D is a view illustrating a fourth example regarding RE mapping of an EREG in a CRS-based N-EPDCCH (or M-EPDCCH).

FIG. 15D illustrates a fourth example regarding RE mapping of an EREG of a CRS-based N-EPDCCH (or M-EPDCCH).

In FIG. 15B, it is assumed that zero (0) OFDM symbol for a PDCCH is provided and a CRS is transmitted through four antenna ports.

For example, in a case where a v-shift value of the CRS is 0, REs of an EREG may be configured within an RB as illustrated in FIG. 15D. In FIG. 15D, REs forming one EREG are indicated by the same number.

When the EREG RE mapping technique is used, since the number of EREGs present within an RB and the number of REs forming the EREGs are the same as those of the legacy EPDCCH, complexity of implementation is reduced. However, since a transmission RE position of the CRS is varied according to a physical cell ID/v-shift value, an RE position forming one EREG is varied according to a position of the CRS. Here, i) the EREG-to-RE mapping according to a position of the CRS may be newly mapped according to a rule such as "increasing order of first the subcarrier index and then the OFDM symbol index starting with the first slot and ending with the second slot" within a PRB in consideration of the changed CRS position. Or, ii) v-shift may be performed together with the EREG-to-REG mapping within the PRB by the v-shifted position of the CRS.

In this case, for example, when only the antenna ports 0 and 1 are used for transmission of the CRS in a specific cell, nothing is transmitted in the RE position in which the CRS of the antenna ports 2 and 3 is transmitted, wasting resource. Thus, in order to prevent such a waste of resource, the MTC device may be assumed as follows.

In a case where the CRS is transmitted only in the antenna port 0, the MTC device may assume that the CRS is transmitted through the antenna port 0 also in the RE region in which the CRS is transmitted through the antenna ports 1, 2, and 3.

Or, in a case where the CRS is transmitted only in the antenna ports 0 and 1, the MTC device may assume that the CRS is transmitted through the antenna ports 0 and 1 also in the RE region in which the CRS is transmitted through the antenna ports 2 and 3. For example, it may be assumed that the CRS is transmitted through the antenna port 0 in the RE region in which the CRS is transmitted through the antenna port 2 and the CRS is transmitted through the antenna port 1 in the RE region in which the CRS is transmitted through the antenna port 3.

That is, regarding the RE position in which the CRS is not transmitted, among the CRS transmission RE positions excluded from the EREG to RE mapping of the N-EPDCCH (or M-EPDCCH), the corresponding RE position is not emptied but may be used for additionally transmitting the CRS through the antenna port in which the CRS is transmitted.

Here, the above assumption may be made only in the OFDM symbol region in which the legacy PDCCH is not transmitted. Or, characteristically, the above assumption may be made only in an OFDM symbol region after an "OFDM symbol position in which transmission of the N-EPDCCH (or M-EPDCCH) configured for the MTC device through RRC signalling" starts.

(5) Fifth Example

On the other hand, an MTC device with low complexity is generally expected not to have high performance, and an MTC device requiring coverage enhancement is expected to operate in a low SINR region. Thus, it may be meaningless to transmit the CRS through four antenna ports to the MTC device and perform data transmission. Also, in the case of the antenna ports 2 and 3, since density of reference signals (RSs) is low, compared with the antenna ports 0, 1, channel estimation performance may not be good.

Thus, regardless of the number of CRS antenna ports used in a specific cell, the BS may use only two antenna ports for an MTC device requiring coverage enhancement (and/or an MTC device with low complexity). That is, when the number of CRS ports determined by the MTC device through blind decoding of a PBCH is greater than 2, the MTC device requiring coverage enhancement (and/or an MTC device with low complexity) may perform reception on the assumption that an N-PDCCH and a PDSCH are transmitted through the CRS of two ports.

In the following descriptions, when a cell uses two (four) CRS antenna ports, it means that the number of CRS antenna ports determined by the MTC device through blind decoding of the PBCH is 2 (4).

In this case, in an environment using a normal CP for transmission of the N-EPDCCH (or M-EPDCCH), the MTC device may use only the EREG to RE mapping such as that of FIG. 15D. Here, CRS transmission in the PRB region in which the N-EPDCCH (or M-EPDCCH) is transmitted may be as follows.

In a case where a cell uses four CRS antenna ports, since the CRS should be transmitted cell-specifically in a non-MBSFN subframe, the MTC device may assume that the CRS is received on the assumption of four legacy ports. That is, it may be assumed that, when the N-EPDCCH (or M-EPDCCH) is transmitted, the CRS of the four legacy ports is transmitted through the RE position emptied in the EREG-to-RE mapping for CRS transmission. Meanwhile, since the legacy CRS is not transmitted in an MBSFN subframe, only the CRS antenna ports 0 and 1 used by the MTC device may be transmitted. In this case, it may be assumed that the CRS antenna ports 0 and 1 are transmitted through the RE position in which the legacy CRS antenna ports 0 1 are transmitted, and the CRS is transmitted through the antenna ports 0 and 1 also in the RE region in which the CRS is transmitted through the antenna ports 2 and 3. For example, it may be assumed that the CRS is transmitted through the antenna port 0 in the RE region in which the CRS is transmitted through the antenna port 2 and the CRS is transmitted through the antenna port 1 in the RE region in which the CRS is transmitted through the antenna port 3.

In a case where a cell uses two CRS antenna ports, it may be assumed that the CRS antenna ports 0 and 1 are transmitted through the RE position in which the legacy CRS antenna ports 0 and 1 are transmitted in both the MBSFN subframe and non-MBSFN subframe and the CRS is transmitted through the antenna ports 0 and 1 also in the RE region in which the CRS is transmitted through the antenna ports 2 and 3. For example, it may be assumed that the CRS is transmitted through the antenna port 0 in the RE region in which the CRS is transmitted through the antenna port 2 and the CRS is transmitted through the antenna port 1 in the RE region in which the CRS is transmitted through the antenna port 3.

Figure 15E:
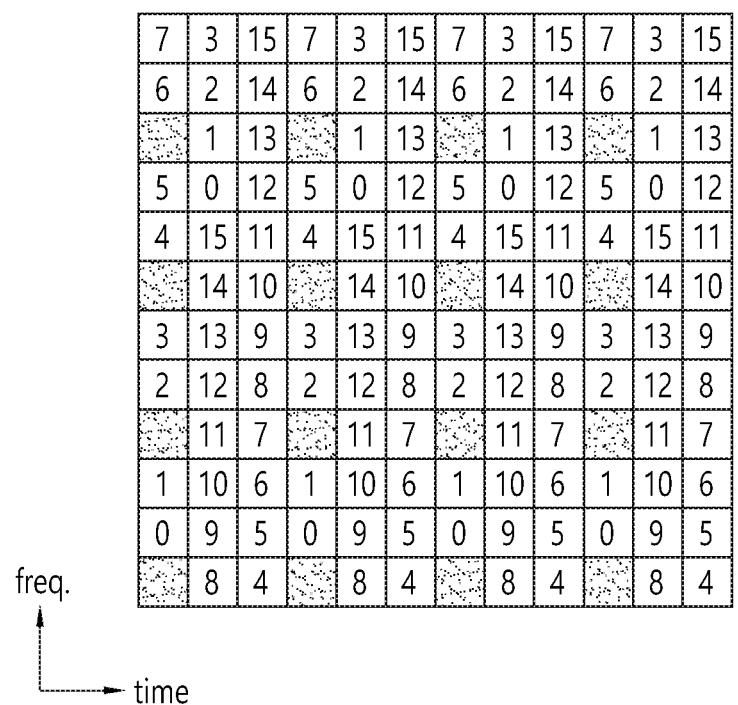
FIG. 15E is a view illustrating a fifth example regarding RE mapping of an EREG in a CRS-based N-EPDCCH (or M-EPDCCH).

In an environment in which an extended CP is characteristically used for transmission of the N-EPDCCH (or M-EPDCCH), the MTC device may use EREG to RE mapping such as that of FIG. 15E.

FIG. 15E illustrates a fifth example regarding RE mapping of an EREG of a CRS-based N-EPDCCH (or M-EPDCCH).

The RE mapping of an EREG illustrated in FIG. 15E excludes RE resource used by the CRS antenna ports 0 and 1 in an extended CP environment. In this case, a total of 16 RE resources per RB are excluded from EREG-to-RE mapping in the same as that of EREG-to-RE mapping. Here, in the PRB region in which the N-EPDCCH (or M-EPDCCH) is transmitted, CRS transmission may be as follows.

In a case where a cell uses four CRS antenna ports, since the CRS should be transmitted cell-specifically in a non-MBSFN subframe, the MTC device may assume that the CRS is received on the assumption of four legacy ports. Here, it may be assumed that transmission of the N-EPDCCH (or M-EPDCCH) is rate-matched (or punctured) in the RE region in which the CRS antenna ports 2 and 3 are transmitted. Meanwhile, it may be assumed that only the CRS antenna ports 0 and 1 are transmitted in an MBSFN subframe.

In a case where a cell uses two CRS antenna ports, the MTC device may assume that CRS is transmitted on the assumption of two ports (antenna ports 0 and 1) in both non-MBSFN subframe and MBSFN subframe.

III-3. CRS and/or DMRS-Based N-EPDCCH (or M-EP-DCCH)

In the case of CRS and/or DMRS-based N-EPDCCH (or M-EPDCCH), RE mapping of an EREG may be performed in consideration of an OFDM symbol region in which a legacy PDCCH is transmitted, an RE resource region in which a DMRS is transmitted, and/or an RE resource region in which a CRS is transmitted.

In a case where the N-EPDCCH (or M-EPDCCH) operates on the basis of the CRS and/or the DMRS, EREG-to-RE mapping of the N-EPDCCH (or M-EPDCCH) may be configured in consideration of only i) the DMRS, ii) only the CRS, or iii) both DMRS and CRS, among the CMRS and the CRS.

In a case where EREG-to-RE mapping considers only the DMRS among the DMRS and the CRS, the EREG-to-RE mapping as in the legacy EPDCCH may be used as is.

When EREG-to-RE mapping considers only the CRS among the DMRS and the CRS, EREG-to-RE mapping of the specified CRS-based N-EPDCCH (or M-EPDCCH) may be applied.

In a case where EREG-to-RE mapping is performed in consideration of both DMRS and CRS, EREG-to-RE mapping may be performed in consideration of a transmission RE position of the entire or partial ports of the DMRS or a transmission RE position of the entire or partial ports of the CRS. For example, EREG-to-RE mapping may be performed using only an RE position excluding an RE position of the DMRS which can be transmitted through every antenna port and an RE position of the CRS which can be transmitted through the antenna ports 0 and 1. Or, for example, EREG-to-RE mapping may be performed using only an RE position excluding an RE position of the DMRS which can be transmitted through every antenna port and an RE position of the CRS which can be transmitted through the antenna ports 0, 1, 2 and 3.

IV. Space Frequency Block Code (SFBC) for N-EPDCCH (or M-EPDCCH)

In this embodiment, it is proposed to use an SFBC technique for transmission of an N-EPDCCH (or M-EPDCCH).

In order to facilitate understanding, the SFBC for transmission of a legacy PDSCH will be described as follows.

Regarding transmission through two antenna ports and $P \in \{0,1\}$, when i of a precoding operation is i=0, 1, . . . , $M^{ap}_{symb}-1$, an output $y(i)=[y^{(0)}(i) y^{(1)}(i)]^T$ is as follows.

$$\begin{bmatrix} y^{(0)}(2i) \\ y^{(1)}(2i) \\ y^{(0)}(2i+1) \\ y^{(1)}(2i+1) \end{bmatrix} = \frac{1}{\sqrt{2}} \begin{bmatrix} 1 & 0 & j & 0 \\ 0 & -1 & 0 & j \\ 0 & 1 & 0 & j \\ 1 & 0 & -j & 0 \end{bmatrix} \begin{bmatrix} \mathrm{Re}(x^{(0)}(i)) \\ \mathrm{Re}(x^{(1)}(i)) \\ \mathrm{Im}(x^{(0)}(i)) \\ \mathrm{Im}(x^{(1)}(i)) \end{bmatrix} \quad \text{[Equation 2]}$$

Here, when $M^{ap}_{symb}=2M^{layer}_{symb}$, i=0, 1, . . . , $M^{layer}_{symb}-1$.

Regarding transmission through four antenna ports and $P \in \{0, 1, 2, 3\}$, when i of the precoding operation is i= 0, 1, . . . , $M^{ap}_{symb}-1$, an output $y(i)=[y^{(0)}(i)y^{(1)}(i)y^{(2)}(i)y^{(3)}(i)]^T$ is as follows.

$$\begin{bmatrix} y^{(0)}(4i) \\ y^{(1)}(4i) \\ y^{(2)}(4i) \\ y^{(3)}(4i) \\ y^{(0)}(4i+1) \\ y^{(1)}(4i+1) \\ y^{(2)}(4i+1) \\ y^{(3)}(4i+1) \\ y^{(0)}(4i+2) \\ y^{(1)}(4i+2) \\ y^{(2)}(4i+2) \\ y^{(3)}(4i+2) \\ y^{(0)}(4i+3) \\ y^{(1)}(4i+3) \\ y^{(2)}(4i+3) \\ y^{(3)}(4i+3) \end{bmatrix} = \frac{1}{\sqrt{2}} \begin{bmatrix} 1 & 0 & 0 & 0 & j & 0 & 0 & 0 \\ 0 & 0 & 0 & 0 & 0 & 0 & 0 & 0 \\ 0 & -1 & 0 & 0 & 0 & j & 0 & 0 \\ 0 & 0 & 0 & 0 & 0 & 0 & 0 & 0 \\ 0 & 1 & 0 & 0 & 0 & j & 0 & 0 \\ 0 & 0 & 0 & 0 & 0 & 0 & 0 & 0 \\ 1 & 0 & 0 & 0 & -j & 0 & 0 & 0 \\ 0 & 0 & 0 & 0 & 0 & 0 & 0 & 0 \\ 0 & 0 & 0 & 0 & 0 & 0 & 0 & 0 \\ 0 & 0 & 1 & 0 & 0 & 0 & j & 0 \\ 0 & 0 & 0 & 0 & 0 & 0 & 0 & 0 \\ 0 & 0 & 0 & -1 & 0 & 0 & 0 & j \\ 0 & 0 & 0 & 1 & 0 & 0 & 0 & j \\ 0 & 0 & 0 & 0 & 0 & 0 & 0 & 0 \\ 0 & 0 & 1 & 0 & 0 & 0 & -j & 0 \end{bmatrix} \begin{bmatrix} \mathrm{Re}(x^{(0)}(i)) \\ \mathrm{Re}(x^{(1)}(i)) \\ \mathrm{Re}(x^{(2)}(i)) \\ \mathrm{Re}(x^{(3)}(i)) \\ \mathrm{Im}(x^{(0)}(i)) \\ \mathrm{Im}(x^{(1)}(i)) \\ \mathrm{Im}(x^{(2)}(i)) \\ \mathrm{Im}(x^{(3)}(i)) \end{bmatrix} \quad \text{[Equation 3]}$$

Here, $$M^{ap}_{symb} = \begin{cases} 4M^{layer}_{symb} & \text{if } M^{(0)}_{symb} \bmod 4 = 0 \\ (4M^{layer}_{symb})-2 & \text{if } M^{(0)}_{symb} \bmod 4 \neq 0 \end{cases},$$

and i=0, 1, . . . , $M^{layer}_{symb}-1$.

Meanwhile, the SFBC may also be applied to the N-EPDCCH (or M-EPDCCH) in the same manner as that described above. Here, mapping of the output symbol $y(i)=[y^{(0)}(i) \ y^{(1)}(i)]^T$, i=0, 1, . . . , $M^{ap}_{symb}-1$ on which the SFBC was performed in the following order may be performing on RE resources forming one EPDCCH.

Mapping regarding resource elements (k, l) of an antenna port P may be performed in order of an index k and an index l which start from a first slot of a subframe and end in a second slot of the subframe.

IV-1. Antenna Port

In a case where the N-EPDCCH (or M-EPDCCH) is transmitted through two antenna ports, an antenna port used for transmission of a DMRS and/or N-EPDCCH (or M-EP-DCCH) regarding a DMRS-based N-EPDCCH (or M-EP-DCCH) or CRS and/or DMRS-based N-EPDCCH (or M-EPDCCH) may be the same as an antenna port used for transmission of a legacy distributed EPDCCH.

Antenna port 107, 109 for normal CP

Antenna port 107, 108 for extended CP

Or, in a case where the N-EPDCCH (or M-EPDCCH) is transmitted through two antenna ports, an antenna port used for transmission of a DMRS and/or N-EPDCCH (or M-EP-DCCH) regarding a DMRS-based N-EPDCCH (or M-EP-DCCH) or CRS and/or DMRS-based N-EPDCCH (or M-EPDCCH) may be different from an antenna port used for transmission of a legacy distributed EPDCCH as follows.

Antenna ports 0, 1 for normal CP

Antenna ports 0, 1 for extended CP

In a case where the N-EPDCCH (or M-EPDCCH) is transmitted through two antenna ports, an antenna port used for transmission of a CRS and/or N-EPDCCH (or M-EPD-CCH) regarding the CRS-based N-EPDCCH (or M-EPD-CCH) may be as follows.

Antenna ports 0, 1 for normal CP

Antenna ports 0, 1 for extended CP

In a case where the N-EPDCCH (or M-EPDCCH) is transmitted through four antenna ports, an antenna port used for transmission of a CRS and/or N-EPDCCH (or M-EPD-CCH) regarding a DMRS-based N-EPDCCH (or M-EPD-CCH) or CRS and/or DMRS-based N-EPDCCH (or M-EP-DCCH) may be as follows.

Antenna ports 107, 108, 109, and 110 for normal CP

Or, in a case where the N-EPDCCH (or M-EPDCCH) is transmitted through four antenna ports, an antenna port used for transmission of a DMRS and/or N-EPDCCH (or M-EP-DCCH) regarding a DMRS-based N-EPDCCH (or M-EP-DCCH) or CRS and/or DMRS-based N-EPDCCH (or M-EPDCCH) may be different from an antenna port used for transmission of a legacy distributed EPDCCH as follows.

Antenna ports 0, 1, 2, and 3 for normal CP

In a case where the N-EPDCCH (or M-EPDCCH) is transmitted through four antenna ports, an antenna port used for transmission of a CRS and/or N-EPDCCH (or M-EPD-CCH) regarding the CRS-based N-EPDCCH (or M-EPD-CCH) may be as follows.

Antenna ports 0, 1, 2, and 3 for normal CP

IV-2. Consideration of CSI-RS Transmission

When the N-EPDCCH (or M-EPDCCH) is transmitted using the SFBC, a CSI-RS (e.g., ZP CSI-RS, NZP CSI-RS) may be transmitted through a transmission resource region of the N-EPDCCH (or M-EPDCCH), unlike the case in which the SFBC is applied to the legacy PDCCH.

Figure 16A:
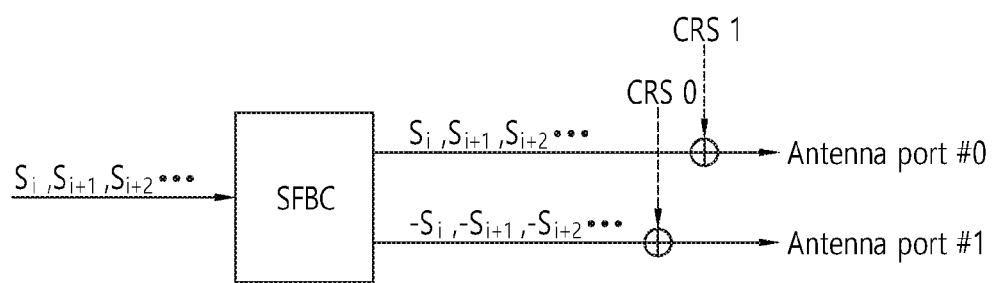
FIGS. 16A and 16B are views illustrating an example of an SFBC using two antennas.
Figure 16B:
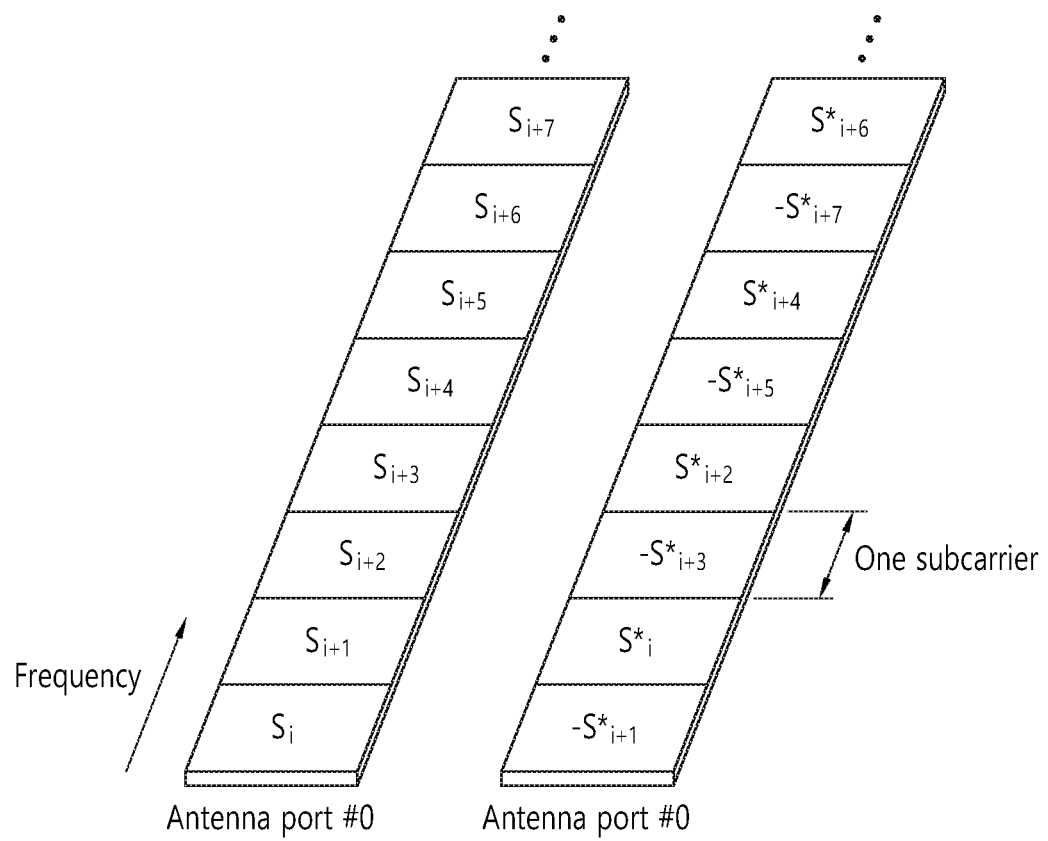

FIGS. 16A and 16B illustrate an example of an SFBC using two antennas.

As illustrated in FIGS. 16A and 16B, when the SFBC is applied using two antenna ports, symbols S(i) and S(i+1) may be transmitted in the same OFDM symbol, S(i) may be transmitted through an antenna port y and an antenna port y+b in a subcarrier x and a subcarrier x+a, and S(i+1) may be transmitted through an antenna port y+b and an antenna port y in the subcarrier x and the subcarrier x+a. Here, S(i) 와 S(i+1) may be called an SFBC pair. In this case, when N-EPDCCH (or M-EPDCCH) is rate-matched and transmitted in the RE position in which a CSI-RS is transmitted so a value of a as an interval between the subcarriers (subcarrier x and subcarrier x+a) in which one SFBC pair is transmitted is greater than 2, a change in channels between the subcarrier x and the subcarrier x+a is increased to reduce performance of the SFBC.

Thus, in order to prevent the performance reduction problem, when an interval between the subcarriers in which one SFBC pair is transmitted is greater than 2, the following operation is proposed.

In a first method, transmission of the N-EPDCCH (or M-EPDCCH) is rate-matched in the subcarrier x. Here, the N-EPDCCH (or M-EPDCCH) is not transmitted in the rate-matched RE position. In this case, the corresponding SFBC pair may start to be transmitted in a first subcarrier among the subcarrier x+a or subcarriers in which the N-EPDCCH (or M-EPDCCH) is transmissible after the subcarrier x+a.

In a second method, transmission of the N-EPDCCH (or M-EPDCCH) is rate-matched in both the subcarriers x and x+a. Here, the N-EPDCCH (or M-EPDCCH) is not transmitted in the RE position in which the N-EPDCCH (or M-EPDCCH) was rate-matched. In this case, the corresponding SFBC may start to transmit the N-EPDCCH (or M-EPDCCH) through the subcarrier x+a+1 or a first subcarrier among transmittable subcarriers after the subcarrier x+a+1.

In a third method, the N-EPDCCH (or M-EPDCCH) is transmitted in the subcarrier x and transmission of the corresponding SFBC pair is dropped in a subcarrier x+a. In this case, transmission of a next SFBC pair may start in the subcarrier x+a.

Meanwhile, when transmission of CSI-RS is considered, since the number of transmittable subcarriers of the N-EPDCCH (or M-EPDCCH) within an OFDM symbol is an odd number, and thus, one SFBC pair may not be fully transmitted within the same OFDM symbol. Or, when an operation in which an interval between subcarriers in which the one SFBC pair is transmitted is greater than 2 is performed, the number of subcarriers (Res) within the OFDM symbol may be insufficient, causing a case in which the one SFBC pair cannot be fully transmitted within the same OFDM symbol. In this case, when a subcarrier position in which one SFBC pair is transmitted is a subcarrier x and a subcarrier x+a, only the subcarrier x is present and the subcarrier x+a is not present. In this case, it is proposed to perform operations as follows.

In a first method, transmission of the N-EPDCCH (or M-EPDCCH) is rate-matched in the subcarrier x. In this case, if a next OFDM symbol is present, the corresponding SFBC pair may be transmitted through the next OFDM symbol.

In a second method, the N-EPDCCH (or M-EPDCCH) is transmitted in the subcarrier x and transmission of the remaining of the SFBC pair is dropped. Here, when a next OFDM symbol is present, transmission of the next SFBC pair may start in a next OFDM symbol.

In a third method, transmission of the N-EPDCCH (or M-EPDCCH) is rate-matched in the entire corresponding OFDM symbol.

IV-3. ECCE to EREG Mapping

As described above, in order to apply the SFBC to the N-EPDCCH (or M-EPDCCH), preferably, an RE position in which one SFBC pair is transmitted is positioned to be as close as possible. In consideration of this, EREG forming one ECCE are formed not to have a continuous index, RE positions of the EREGs forming the ECCE do not have continuously subcarrier positions but have distributed subcarrier positions.

Figure 17A:
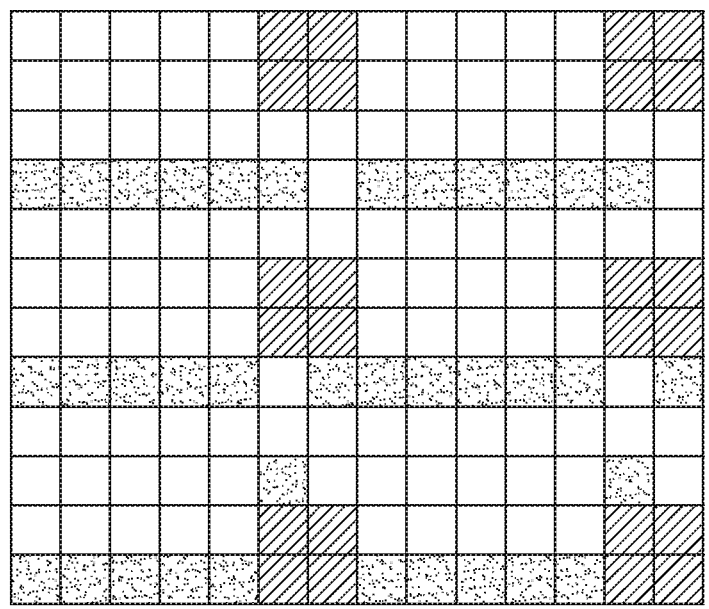
FIGS. 17A and 17B are views illustrating an example of an SFBC.
Figure 17B:
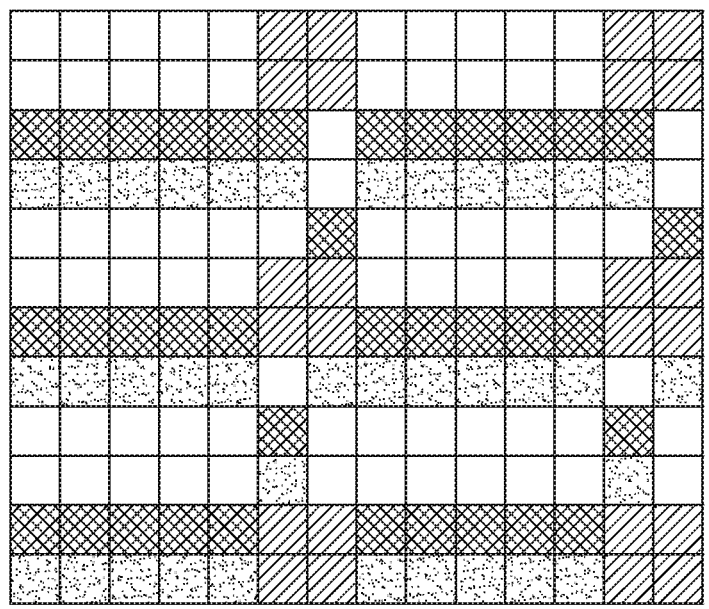

FIGS. 17A and 17B illustrate an example of an SFBC.

In a case where an aggregation level (AL) is 1 in mapping of localized transmission, a subcarrier position of REs forming one EPDDCH candidate are not continuously positioned as illustrated in FIG. 17A. However, when the AL is 2 or greater, at least two REs are positioned in continuous subcarriers as illustrated in FIG. 17B.

Thus, in order to transmit the N-EPDCCH (or M-EPDCCH) in the SFBC technique, it is proposed to apply only mapping of localized transmission (without using mapping of distributed transmission). Also, it is proposed to exclude a case in which the AL is 1. In particular, in order to continuously position REs forming an EPDCCH candidate, the AL may be limited to be 4 or greater.

Also, in order to continuously position positions of subcarriers of REs forming one EPDCCH candidate, when the N-EPDCCH (or M-EPDCCH) is applied to the SFBC, it is proposed for EREGs forming one ECCE to have continuous indices. That is, for example, it is proposed to apply the following ECCE to EREG mapping.

ECCEs available for transmission of the EPDCCH within an EPDCCH set $s_m$ in a subframe i are numbered from 0 to $N_{ECCE,m,i}-1$. The ECCE numbers are as follows.

In PRB index $\lfloor n/N_{RB}^{ECCE} \rfloor$, EREGs are numbered by $(n \bmod N_{RB}^{ECCE})N_{ECCE}^{EREG}+j$.

Here, $j=0, 1, \ldots, N^{EREG}_{ECCE}-1$, and $N^{EREG}_{ECCE}$ is the number of EREGs per ECCE. Also, $N^{ECCE}_{RB}=16/N^{EREG}_{ECCE}$ is the number of ECCEs per pair of resource blocks.

The pair of resource blocks forming the EPDCCH set $S_m$ is numbered from 0 to $N_{RB}^{S_m}-1$ in an ascending order.

V. Transmission of RS for Coverage Enhancement

In the case of an MTC device requiring coverage enhancement, it is important to enhance channel estimation performance for an operation in a very low SNR region. To this end, transmission of a DMRS transmitted through a partial frequency region for demodulation of the N-EPDCCH (or M-EPDCCH) may be as follows. Here, in this embodiment, the DMRS will be described as an example, but the following contents may also be applied to an RS transmitted through a partial frequency region for demodulation of the N-EPDCCH (or M-EPDCCH) like the narrow-CRS transmitted in the MBSFN subframe.

According to the first method, the DMRS may be transmitted through the PRB region in which the N-EPDCCH (or M-EPDCCH) is actually transmitted to the MTC device. In this case, when a PRB position in which the N-EPDCCH (or M-EPDCCH) is transmitted is changed while the N-EPDCCH (or M-EPDCCH) is being repeatedly transmitted in multiple subframes, a position of the PRB region in which the DMRS is transmitted is also changed together. In this case, cross-subframe channel estimation as a technique for increasing channel estimation performance in an environment with less mobility of the MTC device cannot be performed. Thus, in order to perform cross-subframe channel estimation, i) the N-EPDCCH (or M-EPDCCH) should be transmitted at the same aggregation level during the repetition, ii) the N-EPDCCH (or M-EPDCCH) should be transmitted through the same N-EPDCCH (or M-EPDCCH) candidates during the repetition, and iii) the ECCE indices forming one N-EPDCCH (or M-EPDCCH) candidate should be maintained during the repetition or should be maintained during a predetermined time interval.

According to the second method, the DMRS may be transmitted through a reduced band region (e.g., six PRB regions) in which the low-cost MTC device operates. That is, for the MTC device, it may be assumed that the DMRS is transmitted through the entire regions of six PRBs which can be received by the MTC device. In this case, since the amount of resource of the DMRS transmitted within one subframe is increased, compared with the first method, channel estimation performance in the subframe may be enhanced and cross-subframe channel estimation may also be performed. In particular, the DMRS may be transmitted only when the EPDCCH is actually transmitted to the MTC device.

According to the third method, the DMRS may be transmitted through the entire PRB regions forming an N-EPDCCH (or M-EPDCCH)-PRB-set. For example, when an N-EPDCCH (or M-EPDCCH)-PRB-set includes four PRBs, the DMRS may be transmitted through the four PRBs. Here, the DMRS may be transmitted only in a case where the EPDCCH is transmitted is actually transmitted to the MTC device. In this case, although the actual EPDCCH is transmitted only in one PRB region, since the DMRS is transmitted through a larger PRE region, channel estimation performance within a subframe may be enhanced and cross-subframe channel estimation may also be performed.

VI. Cell-Specific Search Space (CSS) on N-EPDCCH (M-EPDCCH)

In a case where the MTC device operates through a reduced bandwidth, rather than in the entire system band, cell-common channels (e.g., PSS/SSS, PBCH, etc.) or data (e.g., SIB) should be transmitted through a common sub-band resource region. That is, for example, when the MTC device operates through six PRB resources irrespective of system bandwidth, the MTC device-specific channels may be transmitted through six PRB regions different for each MTC device but cell-common channels (e.g., PSS/SSS, PBCH, etc.) or data (e.g., SIB) may be transmitted through six central PRB regions of the system bandwidth of the cell. That is, a resource region in which the MTC device performs CSS monitoring should be transmitted through the cell-common sub-band resource region (e.g., the six central PRBs of the system bandwidth of the cell).

In a case where the EPDCCH or a modified EPDCCH, rather than a PDCCH, is used for the MTC device, a cell-common PDSCH such as an SIB may also be scheduled through the EPDCCH. In this case, the MTC device cannot obtain a configuration associated with transmission of the EPDCCH before reading an SIB at an initial connection stage regarding the cell. Thus, the MTC device should know information related to CSS on the EPDCCH without receiving higher layer signalling.

A method thereof will be described.

(1) Sub-Band for CSS Monitoring

The MTC device may attempt at CSS monitoring through six central PRB resources of the system bandwidth of the cell.

(2) Subframe for CSS Monitoring

A subframe resource for the MTC device to monitor a CSS of the EPDCCH may be defined in advance. It may be defined in the form of a subframe period, duration, and offset, for example.

(3) OFDM Start Symbol for CSS Monitoring

In order to know a position of an OFDM symbol at which transmission of the EPDCCH starts, when a maximum number of OFDM symbols available for transmission of a PDCCH in a system bandwidth of a cell is M and one subframe includes OFDM symbols #0 to #13, the MTC device may assume that transmission of the EPDCCH starts from the OFDM symbol #M.

(4) RB Assignment

The MTC device may monitor only one EPDCCH-PRB-set for CSS monitoring. Here, a PRB position of the corresponding EPDCCH-PRB-set may be defined in advance. For example, the PRB position may be defined in advance by a specific 1 RB (e.g., PRB #0) within resource of 6 PRBs received by the MTC device.

(5) EPDCCH Transmission Type

An EPDCCH transmission type within the EPDCCH-PRB-set for CSS monitoring may be defined in advance. The MTC device may assume that the EPDCCH for CSS monitoring is always transmitted in the form of distributed transmission.

(6) Initial Parameter of DMRS Scrambling Sequence

Regarding the EPDCCH for CSS monitoring, a scrambling sequence 의 initialization parameter (i.e., $n_{ID,i}^{EPDCCH}$) for transmission of the EPDCCH and a DMRS associated with the EPDCCH may be fixed to a specific value. Characteristically, a value of the scrambling sequence 의 initialization parameter may be the same as a physical cell ID of a cell.

Meanwhile, a CSS region of the EPDCCH may not be a cell-common sub-band resource region (e.g., six central PRBs), but an EPDCCH CSS region may be present in each of a plurality of sub-band regions as illustrated in FIG. 13B. Thus, the EPDCCH (e.g., EPDCCH scrambled with SI-RNTI, R-RNTI, and/or P-RNTI) transmitted in the EPDCCH CSS region) may be transmitted through each sub-band region (every sub-band region). Thus, the MTC device may monitor the EPDCCH CSS in the sub-band region in which the MTC device operates, rather than switching a frequency (sub-band) from the sub-band region in which the MTC device operates to the cell-common sub-band region.

VII. EPDCCH in Subframe #0 (and Subframe #5)

In a case where the EPDCCH or the modified EPDCCH, rather than a PDCCH, is used for the MTC device and the MTC device operating in a partial band (e.g., six PRBs), rather than in the entire system band of the cell, receives the EPDCCH in the six central PRB regions, a resource region for transmitting the EPDCCH is very limited due to a legacy PBCH and a legacy PSS/SSS in the subframe #0. Also, in the subframe #0, the DMRS is not transmitted in the six central PRB regions due to resource collision with the PSS/SSS. Thus, the current EPDCCH may not be normally transmitted in the six central PRB regions of the subframe #0. Also, in the subframe #5, a resource region for transmitting the EPDCCH is limited due to the legacy PSS/SSS, and the DMRS is not transmitted in the six central PRB regions due to resource collision with the PSS/SSS. Thus, the current EPDCCH may not be normally transmitted in the six central PRB regions of the subframe #5.

Thus, it may be preferred for the EPDCCH not to be transmitted in the six central PRB regions of the subframes #0 (and #5).

Thus, in this embodiment, it is proposed to transmit a DCI, which is to be transmitted through the subframes #0 (and #5), through a preceding subframe. This will be described with reference to the accompanying drawings.

Figure 18:
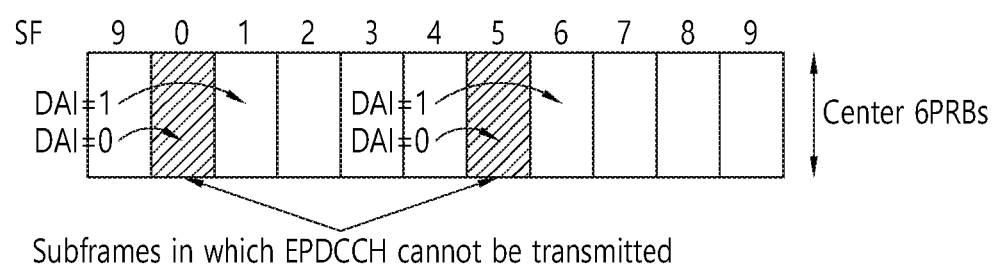
FIG. 18 is a view illustrating an example of transmitting a DCI, which is to be transmitted in subframe #0 (and subframe #5), in a preceding subframe.

FIG. 18 illustrates an example in which a DCI, which is to be transmitted in the subframes #0 (and #5), in a preceding subframe.

In a case where cross-subframe scheduling that a downlink grant transmitted through the EPDCCH in a subframe #n schedules a PDSCH transmitted in a subframe #n+1 is applied to transmit the downlink grant, the downlink grant scheduling a PDSCH transmitted in a subframe #1 (subframe #6) may be transmitted through a subframe #9 (#−1) (subframe #4), a preceding subframe, rather than being transmitted through the original subframe #0 (subframe #5) as illustrated in FIG. 18. In this case, information regarding whether the corresponding downlink grant is for scheduling a PDSCH transmitted through which subframe may be indicated through a specific field, e.g., a DAI field, within the downlink grant.

In a case where cross-subframe scheduling is not applied to transmit the downlink grant, the downlink grant scheduling a PDSCH transmitted in a subframe #0 (subframe #5) may be transmitted through a subframe #9 (#-1) (subframe #4), a preceding subframe, rather than being transmitted through the original subframe #0 (subframe #5). In this case, information regarding whether the corresponding downlink grant is for scheduling a PDSCH transmitted through which subframe may be indicated through a specific field, e.g., a downlink assignment index (DAI) field, within the downlink grant.

Similarly, in the case of transmitting an uplink grant, an uplink grant scheduling a PUSCH transmitted in a subframe #4 (subframe #9) may be transmitted through a subframe #9 (#−1) (subframe #4), a preceding subframe, rather than being transmitted through the original subframe #0 (subframe #5). In this case, information regarding whether the corresponding downlink grant is for scheduling a PUSCH transmitted through which subframe may be indicated through a specific field, e.g., a DAI field, within the uplink grant.

Meanwhile, an EPDCCH may be repeatedly transmitted in multiple subframes to extend coverage. Here, in a case where the EPDCCH is to be transmitted in the central six PRB regions of the subframe #0 (and subframe #5), the MTC device may assume that the EPDCCH transmission is not performed in the corresponding subframe and exclude the corresponding subframe from a bundle of subframes in which the EPDCCH is repeatedly transmitted.

The contents described above may also be applied to transmission of other channels (e.g., a PBCH or a PDSCH), as well as to transmission of the N-EPDCCH.

The embodiments of the present invention described above may be implemented by various means. For example, the embodiments of the present invention may be implemented by hardware, firmware, software, or any combinations thereof. Details thereof will be described with reference to the accompanying drawings.

Figure 19:
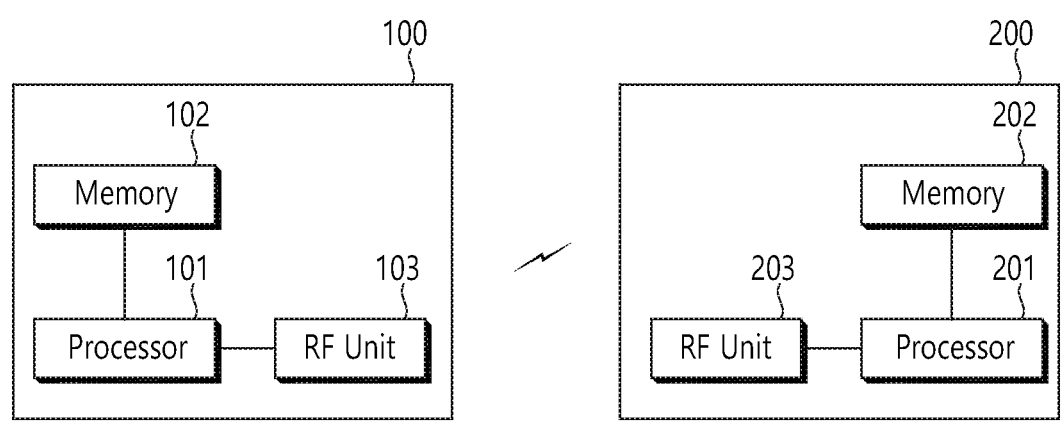
FIG. 19 is a block diagram illustrating a wireless communication system implementing the present disclosure.

FIG. 19 is a block diagram illustrating the wireless communication system in which one embodiment of the present invention is implemented.

A BS 200 includes a processor 201, a memory 202 and an RF (radio frequency) unit 203. The memory 202 is connected to the processor 201, and stores various information for driving the processor 201. The RF unit 203 is connected to the processor 201, and transmits and/or receives radio signals. The processor 201 implements proposed functions, processes and/or methods. In the afore-mentioned embodiment, the operation of the BS 200 can be implemented by the processor 201.

An MTC 100 includes a processor 101, a memory 102 and an RF unit 103. The memory 102 is connected to the processor 101, and stores various information for driving the processor 101. The RF unit 103 is connected to the processor 101, and transmits and/or receives radio signals. The processor 101 implements proposed functions, processes and/or methods.

The processor may include Application-Specific Integrated Circuits (ASICs), other chipsets, logic circuits, and/or data processors. The memory may include Read-Only Memory (ROM), Random Access Memory (RAM), flash memory, memory cards, storage media and/or other storage devices. The RF unit may include a baseband circuit for processing a radio signal. When the above-described embodiment is implemented in software, the above-described scheme may be implemented using a module (process or function) which performs the above function. The module may be stored in the memory and executed by the processor. The memory may be disposed to the processor internally or externally and connected to the processor using a variety of well-known means.

In the above exemplary systems, although the methods have been described on the basis of the flowcharts using a series of the steps or blocks, the present invention is not limited to the sequence of the steps, and some of the steps may be performed at different sequences from the remaining steps or may be performed simultaneously with the remaining steps. Furthermore, those skilled in the art will understand that the steps shown in the flowcharts are not exclusive and may include other steps or one or more steps of the flowcharts may be deleted without affecting the scope of the present invention.

What is claimed is:

1. A method for receiving a downlink control channel, the method performed by a wireless device and comprising:
    monitoring the downlink control channel,
    wherein the downlink control channel is repeated on a plurality of subframes for a coverage enhancement,
    wherein one or more resource elements (REs), on which cell-specific reference signals (CRSs) are transmitted, are not used for a transmission of the downlink control channel,
    wherein one or more resource elements (REs), on which synchronization signals are transmitted, are not used for the transmission of the downlink control channel,
    wherein the downlink control channel is monitored in a common search space (CSS) within a narrowband,
    wherein the narrowband for receiving the downlink control channel includes six maximum physical resource blocks (PRBs),
    wherein the downlink control channel is transmitted based on a localized transmission mode or a distributed transmission mode,
    wherein, within the localized transmission mode, the one or more enhanced resource element groups (EREGs) are transmitted in one physical resource block (PRB) pair to form an enhanced control channel element (ECCE) for the downlink control channel,
    wherein, within the distributed transmission mode, the one or more enhanced resource element groups (EREGs) are transmitted in a plurality of PRB pairs to form the ECCE for the downlink control channel,
    wherein the downlink control channel is an MTC physical downlink control channel (MPDCCH), and
    wherein the distributed transmission mode is used for the CSS.

2. The method of claim 1, wherein the downlink control channel includes a scheduling of a physical downlink shared channel (PDSCH),
    wherein the scheduling of the PDSCH corresponds to a cross subframe scheduling such that a subframe on which the PDSCH is received is later than the plurality of subframes on which the downlink control channel is received.

3. A wireless device for receiving a downlink control channel, comprising:
    a transceiver;
    a processor configured to control the transceiver and configured to: monitor the downlink control channel,
    wherein the downlink control channel is repeated on a plurality of subframes for a coverage enhancement,
    wherein one or more resource elements (REs), on which cell-specific reference signals (CRSs) are transmitted, are not used for a transmission of the downlink control channel,
    wherein one or more resource elements (REs), on which synchronization signals are transmitted, are not used for the transmission of the downlink control channel,
    wherein the downlink control channel is monitored in a common search space (CSS) within a narrowband,
    wherein the narrowband for receiving the downlink control channel includes six maximum physical resource blocks (PRBs),
    wherein the downlink control channel is transmitted based on a localized transmission mode or a distributed transmission mode,
    wherein, within the localized transmission mode, the one or more enhanced resource element groups (EREGs) are transmitted in one physical resource block (PRB) pair to form an enhanced control channel element (ECCE) for the downlink control channel,
    wherein, within the distributed transmission mode, the one or more enhanced resource element groups (EREGs) are transmitted in a plurality of PRB pairs to form the ECCE for the downlink control channel,
    wherein the downlink control channel is an MTC physical downlink control channel (MPDCCH), and
    wherein the distributed transmission mode is used for the CSS.

4. The wireless device of claim 3, wherein the downlink control channel includes a scheduling of a physical downlink shared channel (PDSCH),
    wherein the scheduling of the PDSCH corresponds to a cross subframe scheduling such that a subframe on which the PDSCH is received is later than the plurality of subframes on which the downlink control channel is received.

* * * * *